(12) United States Patent
Nishimura

(10) Patent No.: US 6,320,337 B1
(45) Date of Patent: Nov. 20, 2001

(54) CONTROL DRIVE CIRCUIT AND CONTROL DRIVE METHOD

(75) Inventor: Kiyoshi Nishimura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/679,423

(22) Filed: Oct. 4, 2000

(30) Foreign Application Priority Data

Oct. 6, 1999 (JP) .................................................. 11-285930

(51) Int. Cl.[7] .............................. H02K 29/00; G05F 3/26
(52) U.S. Cl. ........................ 318/254; 318/138; 318/245; 318/439
(58) Field of Search .................................... 318/138, 245, 318/254, 439, 431, 471, 678, 632; 330/255, 51, 258, 261, 257, 288, 265, 267; 307/270, 570; 388/910, 815, 809, 928.1; 361/23, 31; 327/108, 436

(56) References Cited

U.S. PATENT DOCUMENTS

| | | |
|---|---|---|
| 4,403,174 * | 9/1983 | Miyazaki et al. . |
| 4,463,319 * | 7/1984 | Kearney . |
| 5,014,020 * | 5/1991 | Hayashi et al. . |
| 5,084,633 * | 1/1992 | Izadinia . |
| 5,331,259 * | 7/1994 | Naito . |
| 5,378,967 * | 1/1995 | Naito . |
| 5,382,917 * | 1/1995 | Miyake et al. . |
| 5,559,416 * | 9/1996 | Hrassky . |
| 5,574,608 * | 11/1996 | Fukuoka . |
| 5,617,503 * | 4/1997 | Fronen et al. . |
| 5,659,230 * | 8/1997 | Fukuoka . |
| 5,796,276 * | 8/1998 | Phillips et al. . |
| 5,818,179 * | 10/1998 | Kokami et al. . |
| 5,859,510 * | 1/1999 | Dolan et al. . |
| 5,877,602 * | 3/1999 | Kondoh et al. . |

* cited by examiner

*Primary Examiner*—Paul Ip
(74) *Attorney, Agent, or Firm*—Hogan & Hartson, L.L.P.

(57) ABSTRACT

A control drive circuit or the like is provided that is capable of producing a drive output of a higher voltage than a drive power source voltage. A differential amplifier 39 that constitutes a differential amplifying section 14 generates a current Ia on the basis of a current I0 obtained with a constant current generating section 12 and signal waveforms Vina and Vinb inputted from a signal source S. Currents I2 and I4 are generated with a pre-drive section 16. The current I2 corresponds to part of the current Ia that is greater than 1/2·I0 and smaller than 3/4·I0. The current I4 corresponds to part of the current Ia that is greater than 3/4·I0. In other words, part of the current Ia that is greater than 1/2·I0 is divided at the threshold value of 3/4·I0 to obtain the currents I2 and I4. Different coils are driven on the basis of the currents I2 and I4. A drive output of a higher voltage than a drive power source voltage is obtained by synthesizing the outputs produced with the coils.

20 Claims, 23 Drawing Sheets

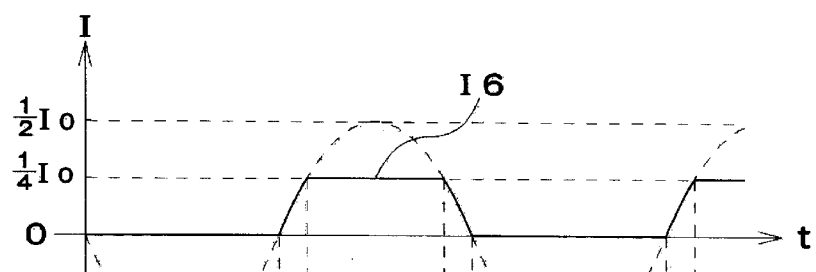
FIG. 8A
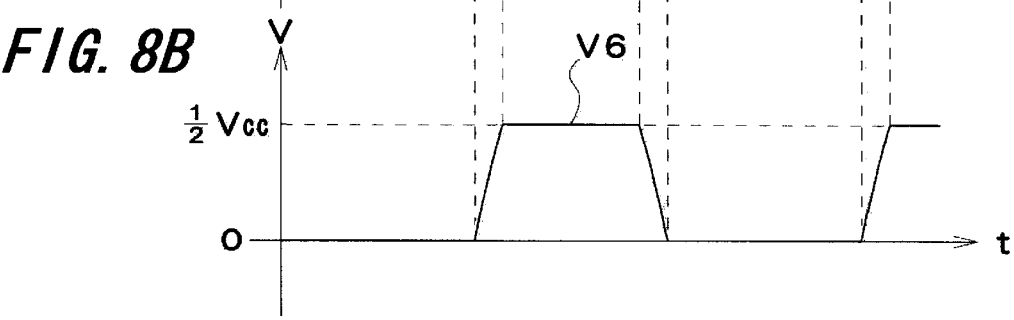
FIG. 8B
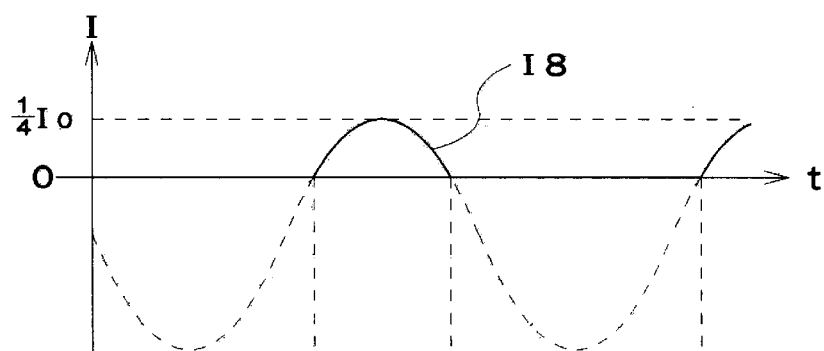
FIF. 8C
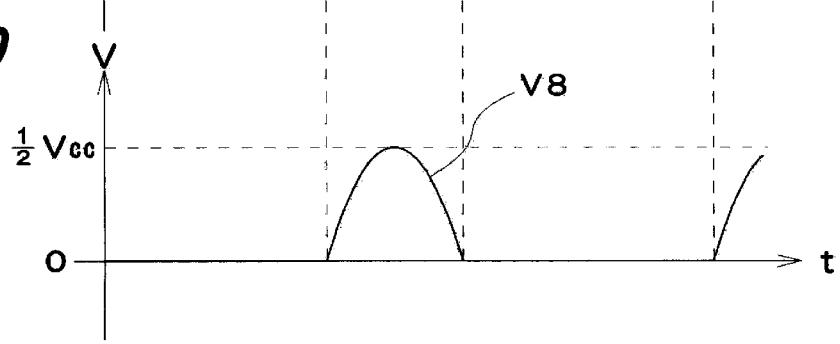
FIG. 8D

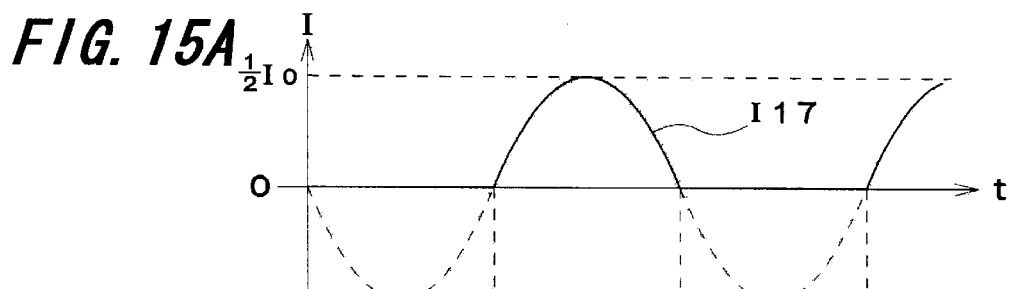
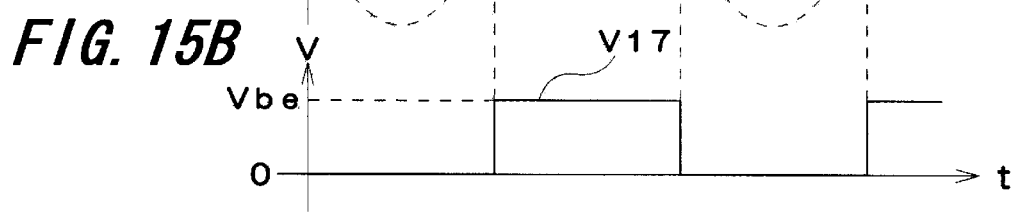
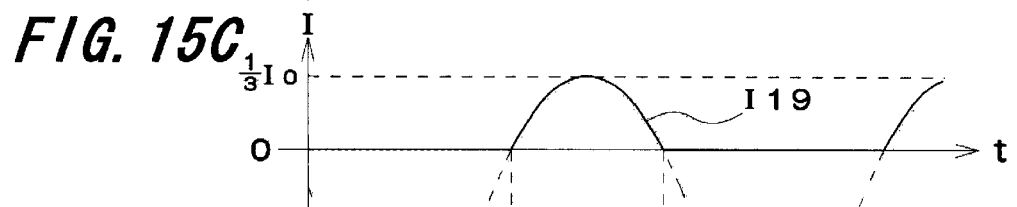
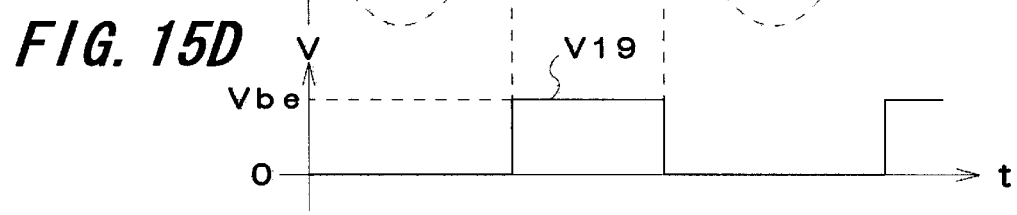
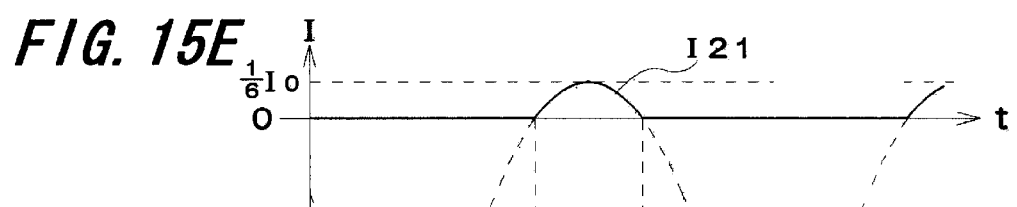
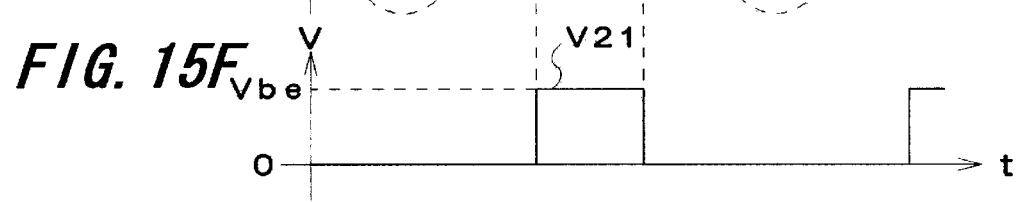

FIG. 16B

FIG. 16F 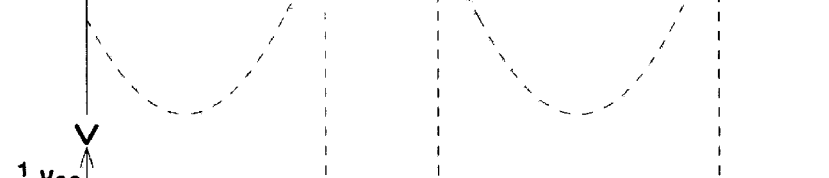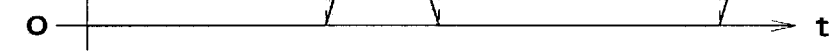

FIG. 21A
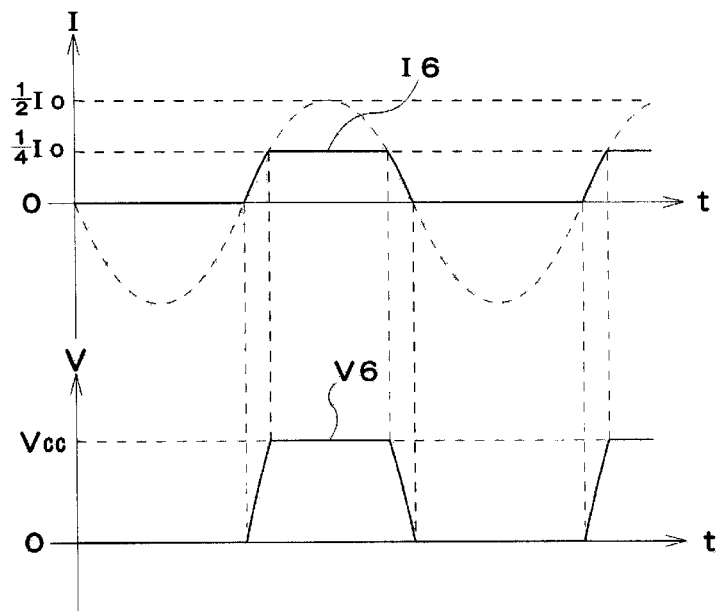
FIG. 21B
FIG. 21C
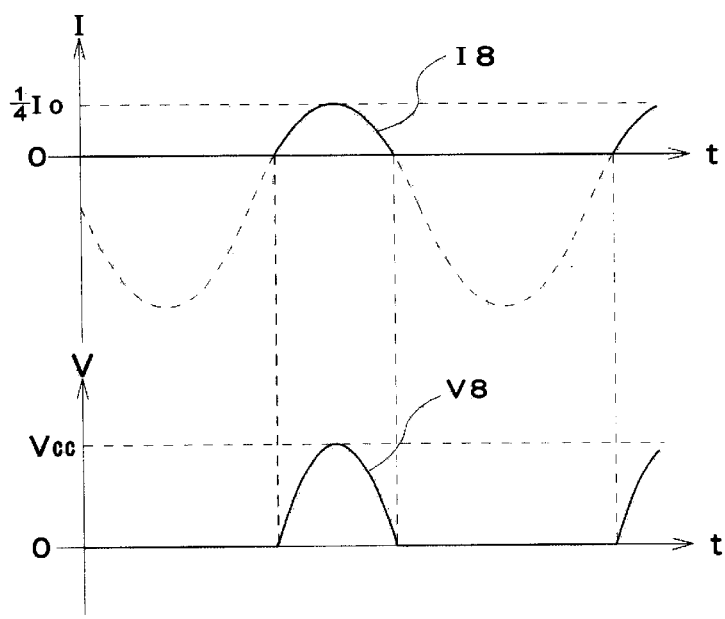
FIG. 21D

CONTROL DRIVE CIRCUIT AND CONTROL DRIVE METHOD

CROSS-REFERENCE TO RELATED APPLICATION

The entire disclosure of a Japanese patent application No. Hei-11-285930 filed Oct.6, 1999 including its specification, claims, drawings, and summary are incorporated herein by reference in its entirety.

BACKGROUND OF THE INVENTION

1. Field of the Invention

This invention relates to a control drive circuit, in particular to a technique that produces a drive output of a voltage that is higher than a power source voltage for the drive.

2. Description of a Prior Art

There are known control drive circuits for use in the servo-control of motors, such as one disclosed in a Japanese patent KOKOKU publication No. Hei-8-23786. FIG. 22 shows the constitution of such a control drive circuit.

The control drive circuit shown in FIG. 22 comprises; a differential amplifier 4, an output circuit 6, and an output synthesizing circuit 8. Signals from a Hall element 2 for detecting motor rotation, etc. are inputted to the differential amplifier 4. Input signals (at the point (a) in FIG. 22) to the differential amplifier 4 are shown in FIG. 23A.

Operation current that affects the amplification gain of the differential amplifier 4 is determined with a current I0. Therefore, the differential output from the differential amplifier 4 consists of the alternate current component from the Hall element 2 superimposed with the direct current component corresponding to I0/2.

The output circuit 6 is constituted to output a current that is equal to the differential output of the differential amplifier 4 minus the direct current component I0/2. The output signals (at points (b) and (c) in FIG. 22) of the output circuit 6 are shown in FIGS. 23B and 23C.

The output synthesizing circuit 8 synthesizes output signals of the output circuit 6, and outputs resultant signals in an absolute value waveform. The output waveform (at the point (d) in FIG. 22) of the output synthesizing circuit 8 is shown in FIG. 23D.

As described above, the use of the control drive circuit shown in FIG. 22 makes it possible to eliminate the influence of the current that affects the amplification gain of the differential amplifier 4 and to obtain the absolute value waveform by extracting only the alternate current component coming from the Hall element 2. Therefore, it is possible to easily obtain the absolute value waveform also with integrated circuits that are required to control the amplification gain with only direct current circuits. Another advantage is that, since no capacitors are used for removing direct current components, there is no restriction on the frequency of processing signals.

However, the conventional control drive circuit technique as described above has the following problem: Although the conventional technique as described above can provide a control drive circuit in a compact size for producing a stabilized voltage for driving a motor or the like to produce a stabilized torque, the circuit is incapable of producing a voltage that is higher than the power source voltage for driving the motor or the like.

SUMMARY OF THE INVENTION

The object of this invention is to provide a control drive circuit, etc. that can eliminate the problem related to the conventional control drive circuit and can provide a driving output of a voltage higher than that of a power source for driving.

A control drive circuit of this invention is one for obtaining a drive output on the basis of an inputted signal waveform and is characterized by comprising;

a reference current generating section for generating a reference current, a control current generating section for generating a control current, with its median being half the reference current, on the basis of the inputted signal waveform, a signal dividing section for obtaining a partial control current by dividing the control current at a specified threshold value, a partial drive output generating section for generating on the basis of the partial control current partial drive outputs not exceeding the drive power source voltage, and a drive output synthesizing section for obtaining a drive output of a higher voltage than the drive power source voltage by synthesizing the generated partial drive outputs.

A control drive method of this invention is one for obtaining a drive output on the basis of an inputted signal waveform and is characterized by the steps of;

generating, on the basis of an inputted signal waveform, partial control signals divided at a specified threshold value, generating, on the basis of the generated partial control signals, partial drive outputs not exceeding a drive power source voltage, and obtaining a drive output of a higher voltage than the drive power source voltage by synthesizing the generated partial drive output.

While the invention may be broadly expressed as the above, its constitution, contents, objects and features will become more clear along with the following description in reference to the appended figures.

BRIEF DESCRIPTION OF THE DRAWINGS

FIGS. 8A to 8D show signal waveforms in various parts of the control drive circuit of an embodiment of the invention.

FIGS. 15A to 15F show signal waveforms in various parts of the control drive circuit of another embodiment of the invention.

FIGS. 16A to 16F show signal waveforms in various parts of the control drive circuit of another embodiment of the invention.

FIGS. 21A to 21D show signal waveforms in various parts of the control drive circuit of still another embodiment of the invention.

DESCRIPTION OF PREFERRED EMBODIMENT

Figure 1:
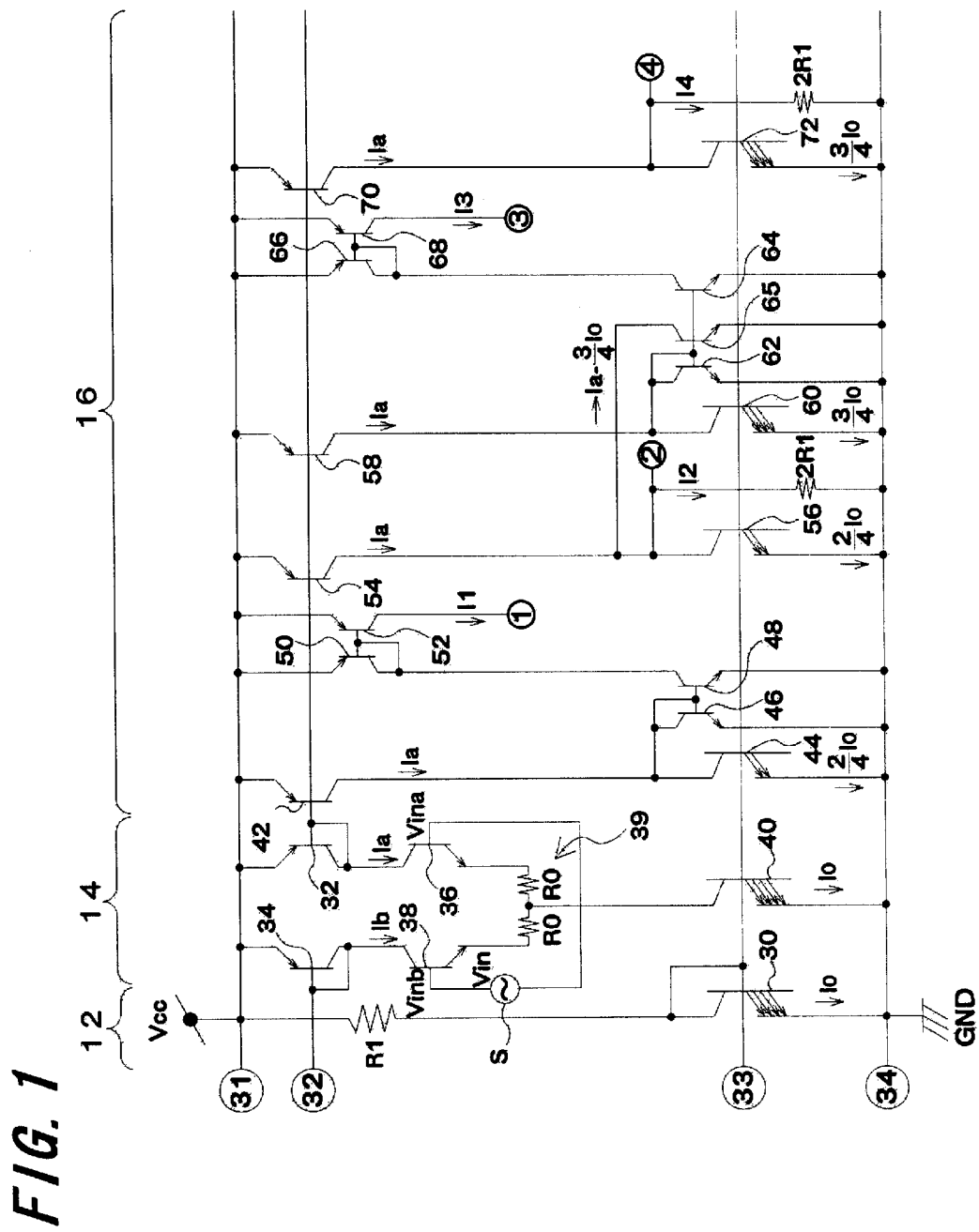
FIG. 1 shows part of a control drive circuit of an embodiment of the invention.
Figure 2:
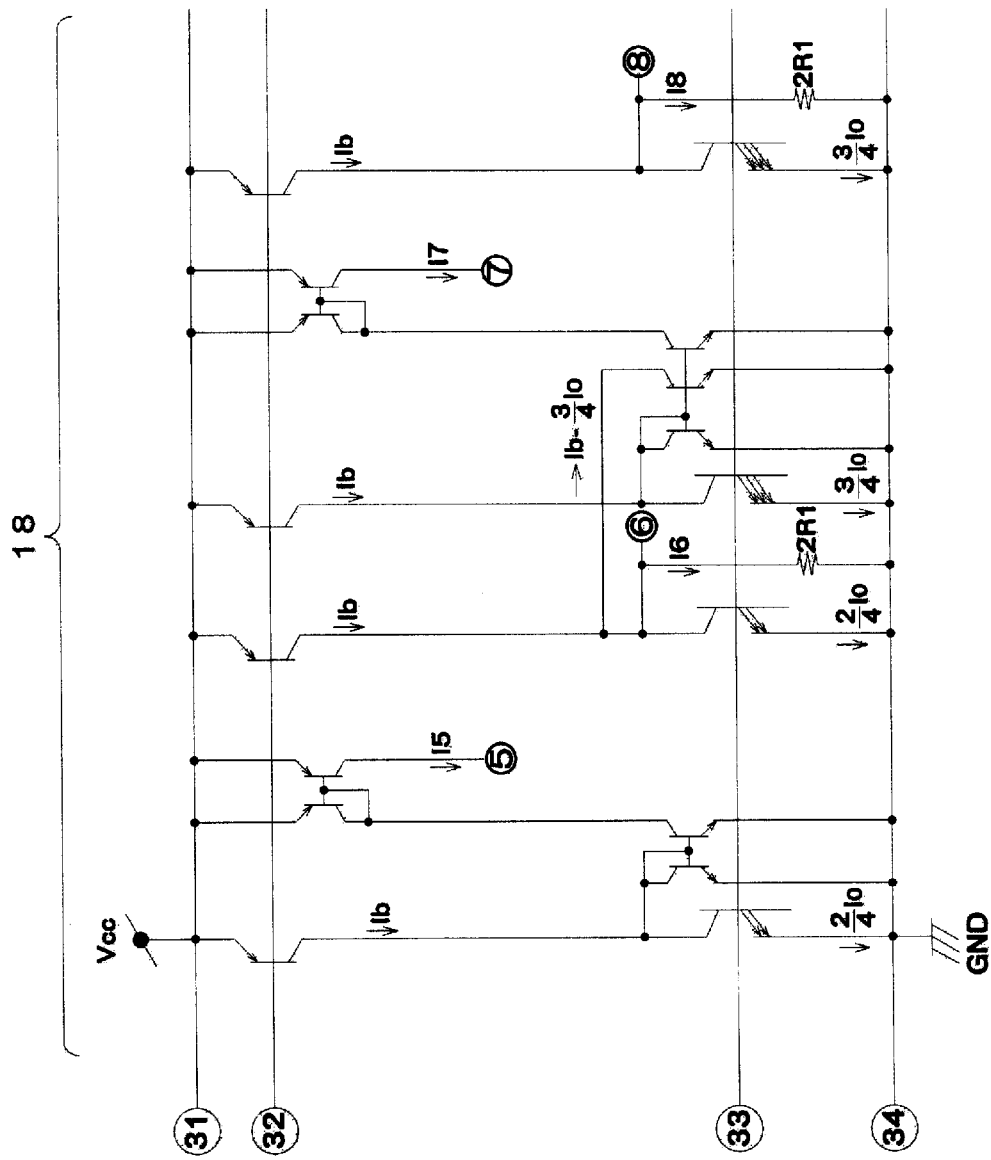
FIG. 2 shows part of a control drive circuit of an embodiment of the invention.
Figure 3:
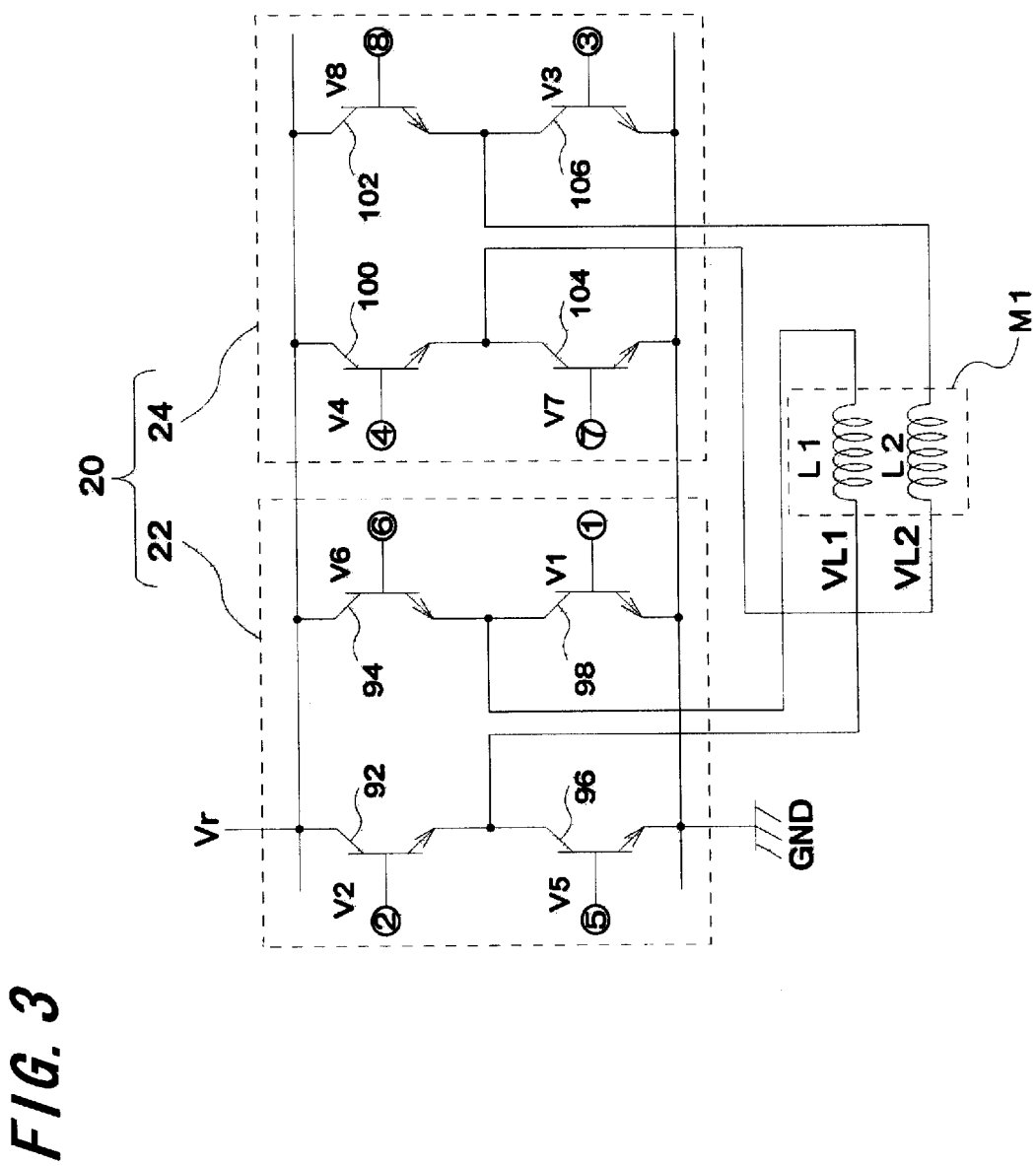
FIG. 3 shows part of a control drive circuit of an embodiment of the invention.

FIGS. 1 to 3 show part of a control drive circuit of an embodiment of the invention. This control drive circuit is for driving motors, audio speakers, and the like. Numerals 1 to 8, and 31 to 34 in circles denote connection points in the circuit. Namely, it should be understood that the same numerals in circles are interconnected in the circuit. It should also be understood that in other embodiments, the same numerals in circles are interconnected in the circuit.

This control drive circuit comprises; a constant current generating section 12 (reference current generating section), a differential amplification section 14 (control current generating sections, and a first pre-drive section 16 (signal dividing section) shown in FIG. 1; a second pre-drive section 18 (signal dividing section) shown in FIG. 2; and drive section 20 (partial drive output generating section) and a brushless servomotor M1 (drive output synthesizing section) shown in FIG. 3. The drive section 20 is provided with two drive circuits 22 and 24 for respectively driving two coils L1 and L2 that constitute the brushless servomotor M1.

The constant current generating section 12 is constituted with a resistor (of a resistance value R1) and a transistor 30 of the npn type having a specified emitter area, both connected in series and interposed between a ground potential GND and a power source Vcc of the control circuit. A constant current I0 (reference current) may be applied to the constant current generating section 12. The collector and the base of the transistor 30 are interconnected.

The differential amplification section 14 comprises; two pnp type transistors 32 and 34, two npn type transistors 36 and 38, and two resistors (of a resistance value R0), that constitute a differential amplifier 39; and an npn type transistor 40 connected to the differential amplifier 39.

Figure 4A:
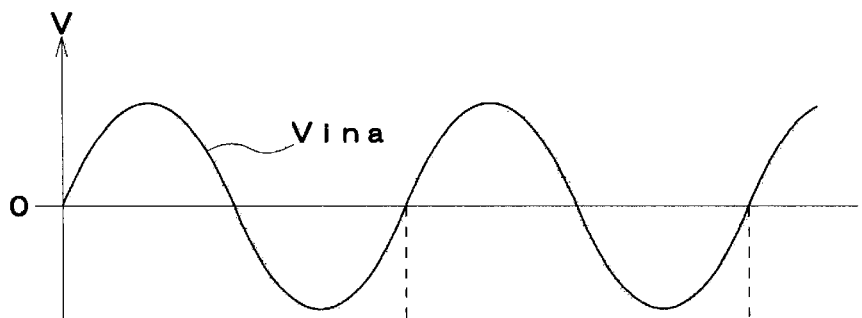
FIGS. 4A to 4D show signal waveforms in various parts of the control drive circuit of an embodiment of the invention.
Figure 4B:
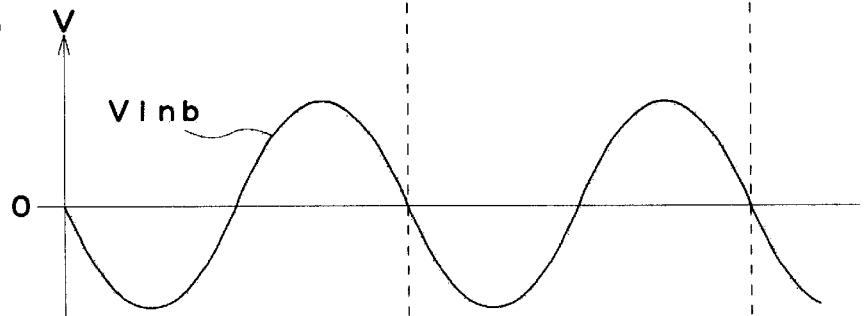

To the bases of the transistors 36 and 38 are supplied signal waveforms Vina and Vinb from a signal source S (of a voltage Vin), respectively. The signal waveforms Vina and Vinb have a mutual phase difference of $\pi$ (Refer to FIGS. 4A and 4B).

The signal source S in this embodiment is for example a sensor constituted with a Hall element or the like disposed in the vicinity of the brushless motor M1 to detect the rotation of the brushless motor M1. In the case the control drive circuit is for use to drive a speaker, the signal source S is for example a speaker drive signal generating section for generating speaker drive signals.

The differential amplifier 39 is driven with the transistor 40. The emitter area of the transistor 40 is the same as that of the transistor 30, with both transistors constituting a current mirror circuit. Therefore, the differential amplifier 39 is also driven with the constant current I0.

That is to say, the sum of the current Ia (control current) flowing through the transistor 32 (or the transistor 36) and the current Ib (control current) flowing through the transistor 34 (or the transistor 38) of the differential amplifier 39 becomes the constant value of I0. This means that both of the current Ia and the current Ib have the same median current value of I0/2 and are in different phases of $\pi$ (Refer to FIGS. 4C and 4D).

Figure 4C:
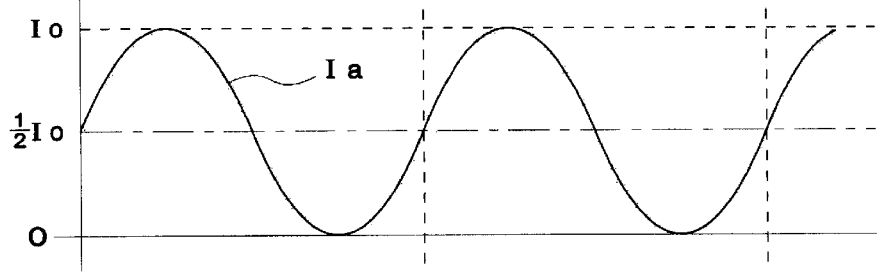
Figure 4D:
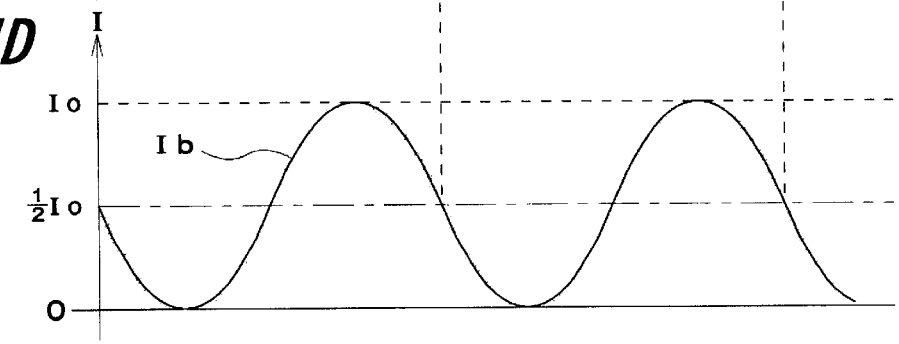

The maximum amplitudes of the current Ia and the current Ib are adjusted to become the same I0 by means of the two resistors (of a resistance value R0) of the differential amplifier 39 (Refer to FIGS. 4C and 4D).

Next, the first pre-drive section 16 will be described. The first pre-drive section 16 comprises 17 transistors 42 to 72 and two resistors (of a resistance value 2R1).

Four pnp type transistors 42, 54, 58, and 70 respectively constitute current mirror circuits with the transistor 32 of the differential amplifier 39. Therefore, the current Ia flows through each of those transistors.

While the four npn type transistors 44, 56, 60, and 72 respectively constitute current mirror circuits with the transistor 30 of the constant current generating section 12, the emitter areas of the transistors 44, 56, 60, and 72 are respectively set to 2/4, 2/4, 3/4, and 3/4 of the emitter area of the transistor 30. Therefore, constant currents 2/4·I0, 2/4·I0, 3/4·I0, and 3/4·I0 can be applied to the transistors 44, 56, 60, and 72.

Transistors 66 and 68 constitute a current mirror circuit. Transistors 50 and 52 of pnp type constitute a current mirror circuit. Transistors 46 and 48 of npn type also constitute a current mirror circuit. An npn type transistor 62 constitutes current mirror circuits with npn type transistors 65 and 64, respectively.

First will be explained how is the current I4 (partial control current, partial control signal) flowing through the resistor (of a resistance value 2R1) connected in parallel to the transistor 72. Since the collector of the transistor 72 is connected to the collector of the transistor 70, the current I4 is equal to the current Ia flowing through the transistor 70 minus the current 3/4·I0 flowing through the transistor 72. However, when the current Ia is less than 3/4·I0, no current flows through the resistor. Therefore, the current I4 is as shown in FIG. 6C.

Figure 6A:
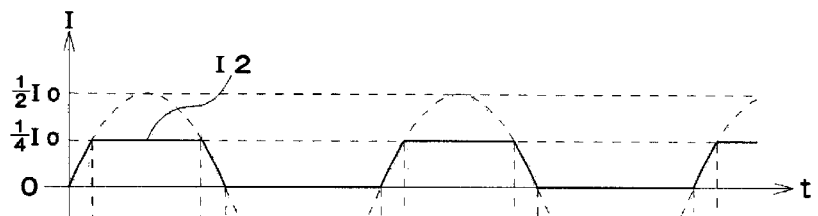
FIGS. 6A to 6D show signal waveforms in various parts of the control drive circuit of an embodiment of the invention.
Figure 6B:
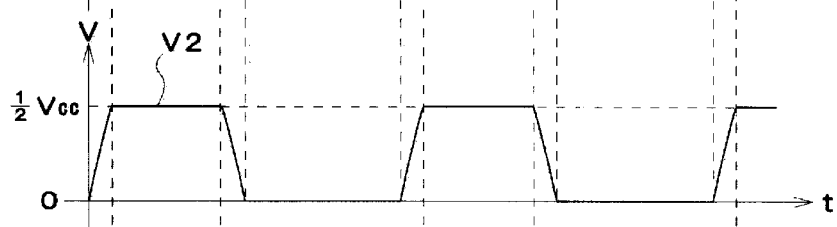
Figure 6C:
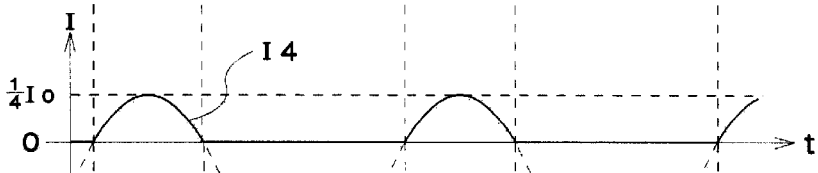

From FIG. 6C, it is seen that the current I4 corresponds to part of the current Ia shown in FIG. 4C that is greater than 3/4·I0.

Next will be explained how is the current I2 (partial control current, partial control signal) flowing through the resistor (of a resistance value 2R1) connected in parallel to the transistor 56. Since the collector of the transistor 56 is connected to the collector of the transistor 54 and to the collector of the transistor 65, the current I2 is equal to the current Ia flowing through the transistor 54 minus the current 2/4·I0 flowing through the transistor 56 and minus the current flowing through the transistor 65.

Here, since no current flows through the resistor when the current Ia is less than 2/4·I0, the result of subtracting the current 2/4·I0 flowing through the transistor 56 from the current Ia flowing through the transistor 54 is equal to part of the current Ia shown in FIG. 4C exceeding 1/2·I0 (the same as the current I1 which will be described later, Refer to FIG. 5A).

On the other hand, the current flowing through the transistor 65 is equal to the current flowing through the transistor 62, namely equal to the current Ia flowing through the transistor 58 minus the current 3/4·I0 flowing through the transistor 60. However, when the current Ia is less than 3/4·I0, no current flows through the transistors 62 and 65. In effect, the current flowing through the transistor 65 is equal to the above-described current I4 (Refer to FIG. 6C).

Figure 5A:
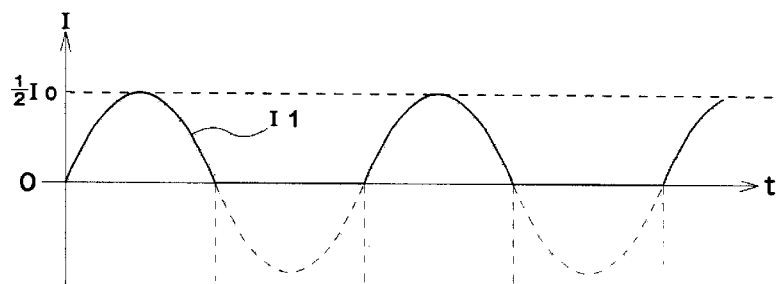
FIGS. 5A to 5D show signal waveforms in various parts of the control drive circuit of an embodiment of the invention.

Therefore, the current I2 is equal to part of the current Ia shown in FIG. 4C exceeding the 1/2·I0 (the same as the current I1, Refer to FIG. 5A) further minus the current I4. Therefore, the current I2 is as shown in FIG. 6A. From FIG. 6A, it is seen that the current I2 corresponds to part of the current Ia shown in FIG. 4C that is greater than 1/2·I0 and smaller than 3/4·I0.

In effect, it is constituted that part of the current Ia shown in FIG. 4C that is greater than 1/2·I0 is divided at the threshold value 3/4·I0, part that is greater than the threshold value is taken out as the current I4, and part that is smaller than the threshold value is taken out as the current I2.

Figure 6D:
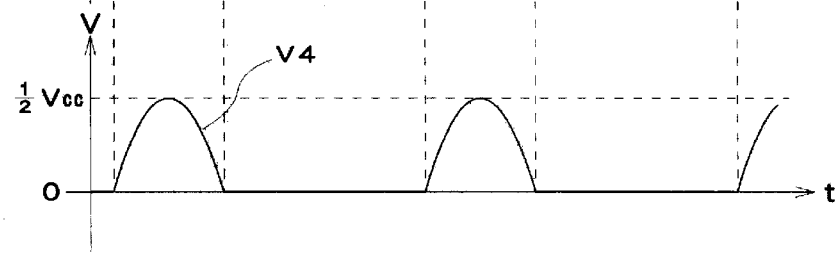

The currents I4 and I2 taken out as described above are converted to voltages and given to the drive section 20. That is, a voltage V4 is produced at the top end of the resistor (of the resistance value 2R1) with the current I4 and applied to the base of a transistor 100 which constitutes a drive circuit 24. The voltage V4 is shown in FIG. 6D.

Here, the voltage V4 is the product 2R1·I4 of the current I4 and the resistance 2R1, and the maximum value of the current I4 is 1/4·I0 (Refer to FIG. 6C). Therefore, the maximum value of the voltage V4 is 1/2·R1·I0. On the other hand, as is seen from the constant current generating section 12, R1·I0=Vcc. That is, the maximum value of the voltage V4 is 1/2·Vcc (Refer to FIG. 6D).

A voltage V2 produced at the top end of the resistor (of a resistance value 2R1) with the current I2 is applied to the base of a transistor 92 which constitutes the drive circuit 22. The voltage V2 is shown in FIG. 6B. Like the voltage V4, the maximum value of the voltage V2 is 1/2·Vcc.

Next will be explained how is the current I3 flowing through the transistor 68. The same amount of current as that flowing through the transistors 66 and 64 flows through the transistor 68. On the other hand, the same amount of current as that flowing through the transistor 65 flows through the transistor 64. The amount of current flowing through the transistor 65 is the same as that of the current I4 as described above. Therefore, the amount of the current I3 flowing through the transistor 68 is the same as that of the current I4. The current I3 is shown in FIG. 5C.

Next will be explained how is the current I1 flowing through the transistor 52. The same amount of current as that flowing through the transistors 50 and 48 flows through the transistor 52. On the other hand, the same amount of current as that flowing through the transistor 46 flows through the transistor 48.

Since the collector of the transistor 46 is connected to the collector of the transistor 42 and to the collector of the transistor 44, the current flowing through the transistor 46 is equal to the current Ia flowing through the transistor 42 minus the current 2/4·I0 flowing through the transistor 44. That is, the current I1 is the current Ia minus the current flowing through the transistor 44, 2/4·I0. That is, the current I1 is the current Ia minus the current 2/4·I0. However, when the current Ia is less than 2/4·I0, no current flows through the transistor 52. Therefore, the current I1 is as shown in FIG. 5A.

Those currents I3 and I1 are supplied to the drive section 20 shown in FIG. 3. Incidentally, a voltage V3 shown in FIG. 5D is produced with the current I3 at the base of a transistor 106 which constitutes the drive circuit 24. And a voltage V1 shown in FIG. 5B is produced with the current I1 at the base of a transistor 98 which constitutes the drive circuit 22.

Figure 5B:
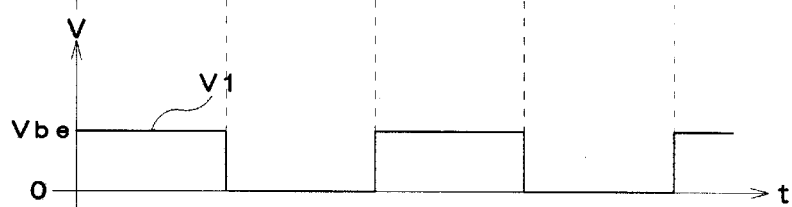
Figure 5C:
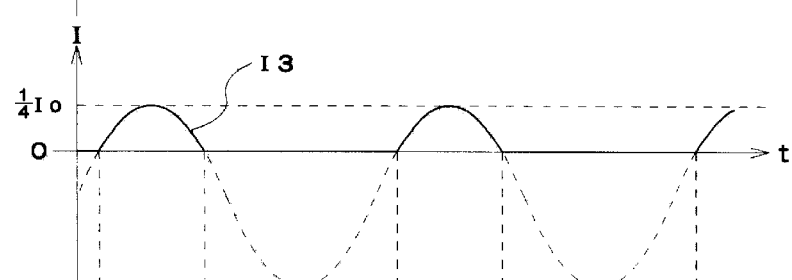
Figure 5D:

Since the emitters of the transistors 106 and 98 are grounded, the maximum values of the voltages V3 and V1 are saturation voltages Vbe between the base and emitter of the transistors 106 and 98 (Refer to FIGS. 5D and 5B).

Next will be described the second pre-drive section 18 shown in FIG. 2. The second pre-drive section 18 comprises 17 transistors and two resistors (of a resistance value 2R1) and is constituted similarly to the first pre-drive section 16. Therefore, its function is also similar to that of the first pre-drive section 16.

In the first pre-drive section 16, the current Ia is inputted as the control current. On the other hand in the second pre-drive section 18, a current Ib as a control current that is different in phase by $\pi$ from the current Ia is inputted (Refer to FIGS. 4C and 4D). Therefore, the signal waveforms at various points in the circuit are different in phase by $\pi$ from the signal waveforms in the first pre-drive section 16. The signal waveforms in the second pre-drive section 18 are shown in FIGS. 7A to 8D as counterparts of those in the first pre-drive section 16 shown in FIGS. 5A to 6D, respectively.

Next will be described the drive section 20 shown in FIG. 3. As described above, the drive section 20 is provided with two drive circuits 22 and 24 for respectively driving two coils L1 and L2 that constitute the brushless servomotor M1.

The drive circuit 22 comprises four npn transistors 92, 94, 96, and 98 interconnected in the shape of a bridge. A power source voltage Vr of the drive section 20 is given to the collectors of the transistors 92 and 94. The emitters of the transistors 96 and 98 are set to the ground voltage GND.

The coil L1 is interposed to make connection between the point where the emitter of the transistor 92 and the collector of the transistor 96 are interconnected and the point where the emitter of the transistor 94 and the collector of the transistor 98 are interconnected.

The drive circuit 24 is constituted similarly to the drive circuit 22. However, the coil L2 is connected in the drive circuit 24.

The coils L1 and L2 are disposed in parallel in the brushless servomotor M1. Therefore, outputs of the coils L1 and L2 are superimposed to become the output of the brushless servomotor M1.

Figure 9A:
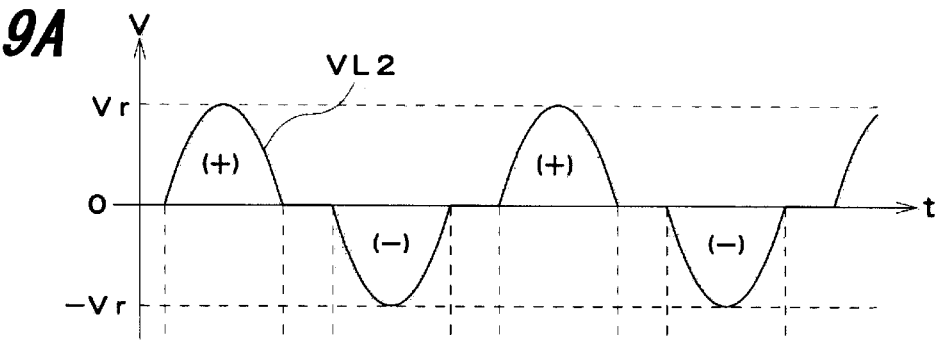
FIGS. 9A to 9C show signal waveforms in various parts of the control drive circuit of an embodiment of the invention.
Figure 9B:
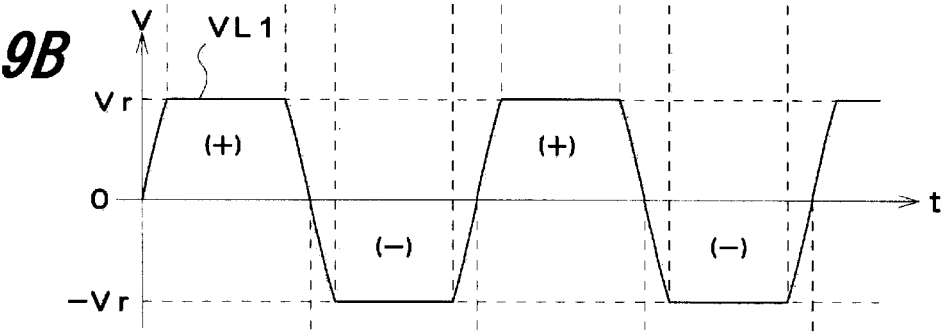
Figure 9C:
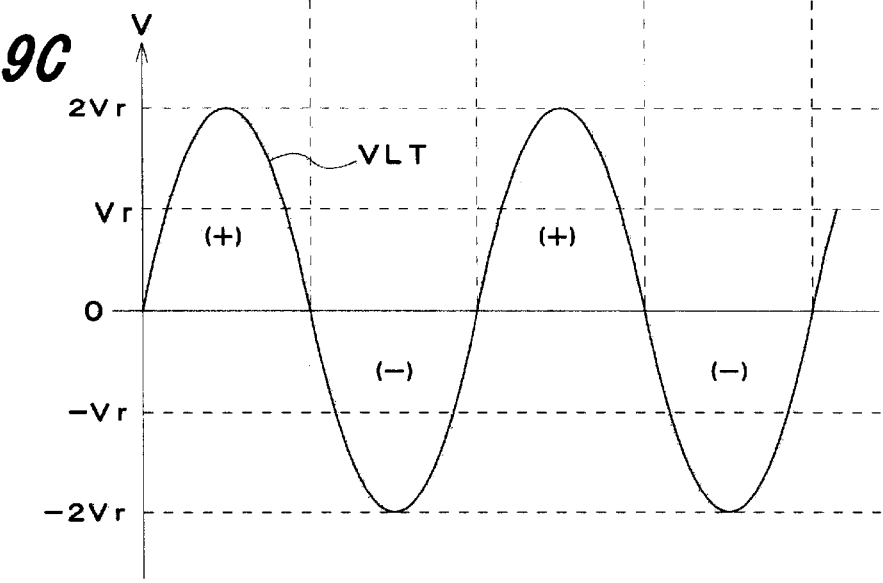

A voltage VL1 appearing at one end of the coil L1 relative to a voltage appearing at the other end of the coil L1 is shown in FIG. 9B. A voltage VL2 appearing at one end of the coil L2 relative to a voltage appearing at the other end of the coil L2 is shown in FIG. 9A. A voltage VLT produced by synthesizing (summing up) the voltages appearing on the coils L1 and L2 is shown in FIG. 9C.

When I1 shown in FIG. 5A and V2 shown in FIG. 6B are respectively given to the bases of the transistors 98 and 92 of the drive circuit 22, a positive voltage VL1(+) with its maximum voltage being the power source voltage Vr of the drive section 20 appears at one end of the coil L1 as shown in FIG. 9B.

Figure 7A:
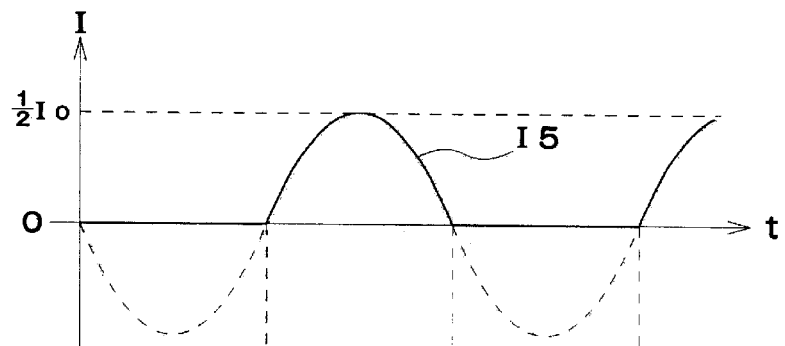
FIGS. 7A to 7D show signal waveforms in various parts of the control drive circuit of an embodiment of the invention.
Figure 7B:
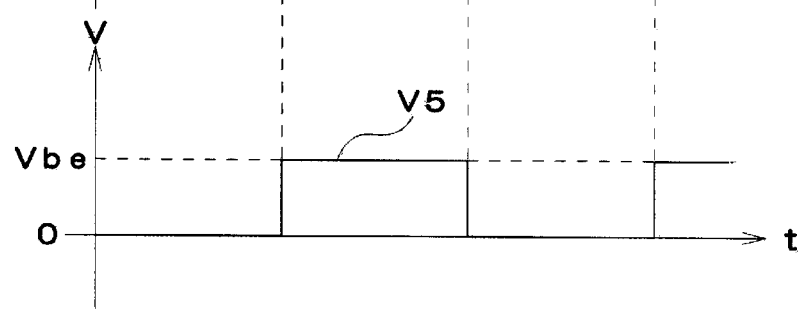

On the other hand, when I5 shown in FIG. 7A and V6 shown in FIG. 8B are given respectively to the bases of the transistors 96 and 94 of the drive circuit 22, a negative voltage VL1(−) with its minimum voltage being the negative value of the power source voltage Vr of the drive section 20 appears at one end of the coil L1 as shown in FIG. 9B.

In effect, the positive voltage VL1(+) and the negative voltage VL1(−) appear alternately at one end of the coil L1.

Next, when I3 shown in FIG. 5C and V4 shown in FIG. 6D are given to the bases of the transistors 106 and 100 of the drive circuit 24, a positive voltage VL2(+) with its maximum voltage being the power source voltage Vr of the drive section 20 appears at one end of the coil L2 as shown in FIG. 9A.

Figure 7C:
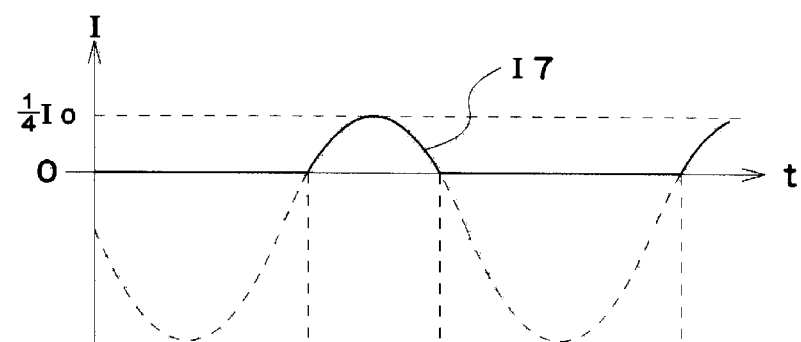
Figure 7D:
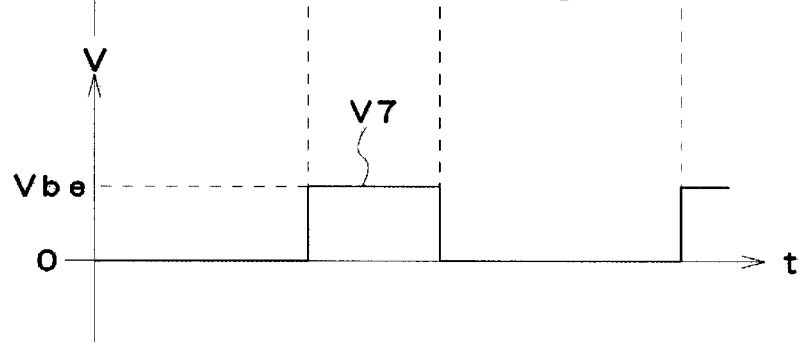

On the other hand, when I7 shown in FIG. 7C and V8 shown in FIG. 8D are given respectively to the bases of the transistors 104 and 102 of the drive circuit 24, a negative voltage VL2(−) with its minimum voltage being the negative value of the power source voltage Vr of the drive section 20 appears at one end of the coil L2 as shown in FIG. 9A.

In effect, the positive voltage VL2(+) and the negative voltage VL2(−) appear alternately at one end of the coil L2.

As described above, the outputs of the coils L1 and L2 are superimposed to be the output of the brushless servomotor M1. That is, the voltage VLT produced by synthesizing (summing up) the voltages appearing in the coils L1 and L2 has an alternating waveform as shown in FIG. 9C in which a positive voltage VLT(+) with its maximum value being twice the power source voltage Vr of the drive section 20 and a negative voltage VLT(−) with its minimum value being twice the negative value of the power source voltage Vr of the drive section 20 appear alternately. That is to say, a drive output having an amplitude that is four times the amplitude of the power source voltage Vr of the drive section 20 is obtained.

In this embodiment, the power source voltage Vr of the drive section 20 is set to the maximum voltage produced at the top end of the resistor (of a resistance value 2R1), or ½ of the power source voltage Vcc of the control circuit. Therefore, an output having twice the amplitude of the power source voltage Vcc of the control circuit is obtained as the output of the brushless servomotor M1.

This embodiment as described above makes it possible with a simple structure to provide a drive output of a voltage that is higher than the power source voltage Vr of the drive section 20. Therefore, a dynamic range can be increased with a simple structure. Another feature is that, when the amplitude of an inputted signal waveform is less than ½ of an assumed maximum amplitude, all the four transistors constituting the drive circuit 24 are turned off. As a result, power is saved when the input level is low.

Moreover, when the partial control current is obtained by dividing the control current at a specified threshold value, it is arranged to obtain the partial control current that is smaller than the threshold value by taking away the partial control current that is greater than the threshold value from the control current. Therefore, a partial control current having less distortion is obtained.

While the above embodiment is explained as an example in which the half-wave of the control current (current Ia, current Ib) is divided into two (full-wave is divided into four), this invention is not limited to the above embodiment but may be arranged for example with the half-wave divided into three (full-wave divided into six).

FIGS. 10 to 17 are figures for explaining an embodiment arranged with the half-wave of the control current divided into three (full-wave divided by six).

Figure 10:
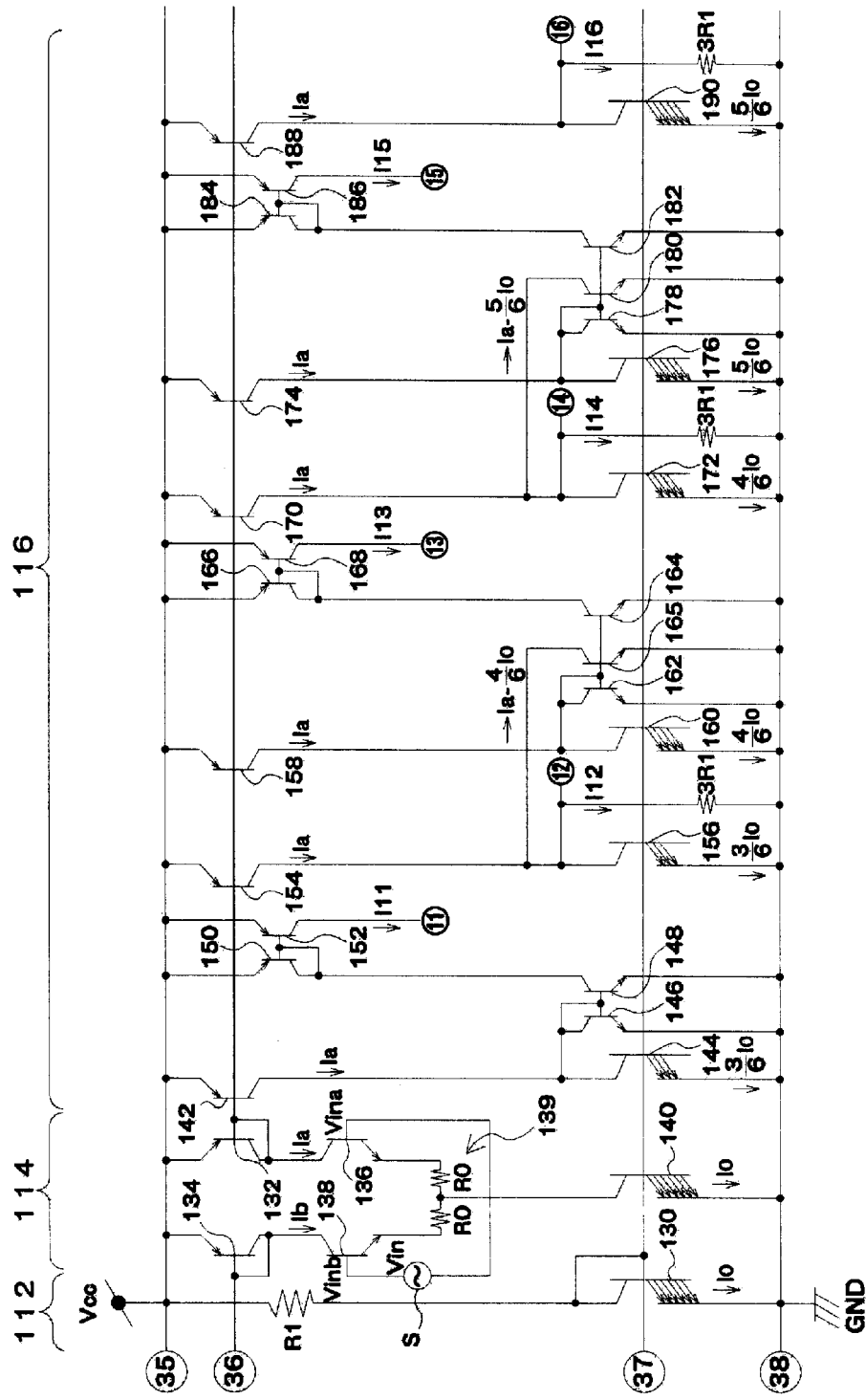
FIG. 10 shows part of a control drive circuit of another embodiment of the invention.
Figure 11:
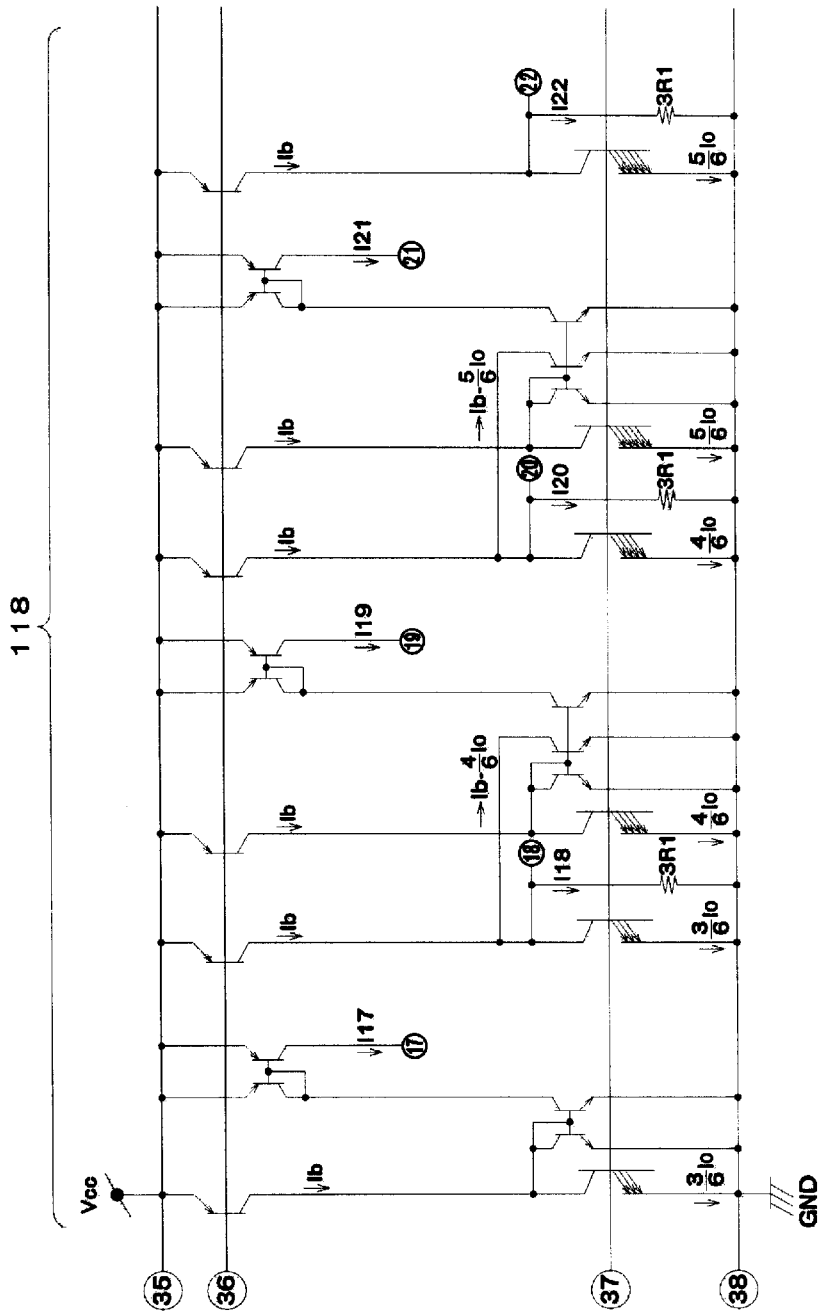
FIG. 11 shows part of a control drive circuit of another embodiment of the invention.
Figure 12:
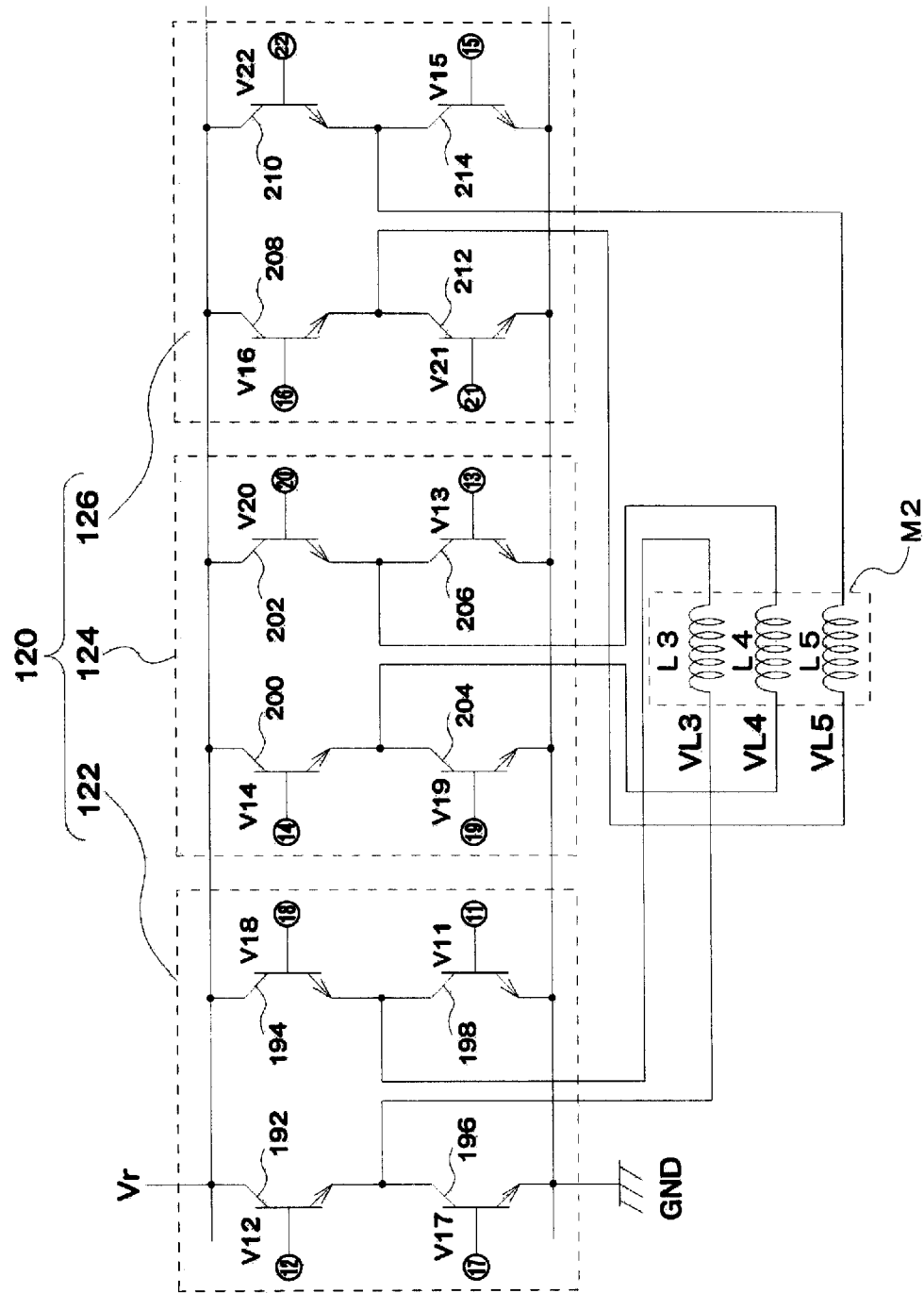
FIG. 12 shows part of a control drive circuit of another embodiment of the invention.

A control drive circuit of this embodiment is shown in FIGS. 10 to 12. The control drive circuit comprises; a constant current generating section 112 (reference current generating section), a differential amplifier section 114 (control current generating section), and a first pre-drive section 116 (signal dividing section) shown in FIG. 10; a second pre-drive section 118 (signal dividing section) shown in FIG. 11; and a drive section 120 (partial drive output generating section), and a brushless servomotor M2 (drive output synthesizing section) shown in FIG. 12.

The constant current generating section 112 shown in FIG. 10 is similarly constituted to the constant current generating section 12 shown in FIG. 1. That is, the transistor 130 of the constant current generating section 112 is a counterpart of the transistor 30 of the constant current generating section 12 shown in FIG. 1.

The differential amplifier section 114 shown in FIG. 10 is similarly constituted to the differential amplifier section 14 shown in FIG. 1. That is, the transistors 132, 134, 136, 138, and 140 of differential amplifier section 114 are counterparts of the transistors 32, 34, 36, 38, and 40 of the differential amplifier section 14 shown in FIG. 1.

Therefore, signal waveforms Vina and Vinb inputted to the bases of the transistors 136 and 138, and the currents Ia and Ib that flow through the transistors 132 and 134 are as shown in FIGS. 4A to 4D.

The first pre-drive section 116 shown in FIG. 10 is a counterpart of the first pre-drive section 16 shown in FIG. 1. However, the former in which the half-wave of the control current is divided into three parts is different from the latter in which the half-wave of the control current is divided into two parts. That is, while the first pre-drive section 16 shown in FIG. 1 comprises 17 transistors 42 to 72 and two resistors (of a resistance value 2R1), the first pre-drive section 116 shown in FIG. 10 comprises 26 transistors 142 to 190 and three resistors (of a resistance value 3R1).

The six transistors of the pnp type 142, 154, 158, 170, 174, and 188 respectively constitute current mirror circuits with the transistor 132 of the differential amplifier 139. Therefore, the current Ia flows through each of those transistors.

The six transistors 144, 156, 160, 172, 176, and 190 of the npn type respectively constitute current mirror circuits with the transistor 130 of the constant current generating section 112, and the emitter areas of the transistors 144, 156, 160, 172, 176, and 190 are respectively set to 3/6, 3/6, 4/6, 4/6, 5/6, and 5/6 of the emitter area of the transistor 130. Therefore, constant currents 3/6·I0, 3/6·I0, 4/6·I0, 4/6·I0, 5/6·I0, and 5/6·I0 may be respectively supplied to those transistors 144, 156, 160, 172, 176, and 190.

The pnp type transistors 150 and 152 constitute a current mirror circuit. Transistors 166 and 168 constitute a current mirror circuit. Transistors 184 and 186 constitute a current mirror circuit. Also, the npn type transistors 146 and 148 constitute a current mirror circuit. Also, the npn type transistor 162 constitutes current mirror circuits with the npn type transistors 165 and 164, respectively. Also, the npn type transistor 178 constitutes current mirror circuits with the npn type transistors 180 and 182, respectively.

The current I16 (partial control current, partial control signal) that flows through a resistor (of a resistance value 3R1) in parallel connection with the transistor 190 may be determined in a similar method to that used when determining the current I4 of the previous embodiment. The current I16 determined according to the method is as shown in FIG. 14E.

Figure 14A:
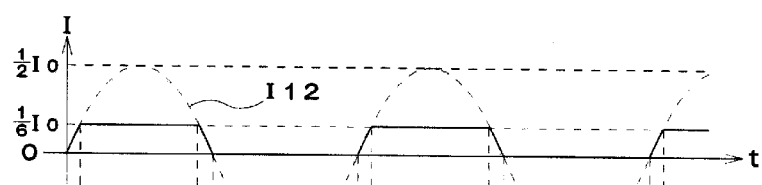
FIGS. 14A to 14F show signal waveforms in various parts of the control drive circuit of another embodiment of the invention.
Figure 14B:
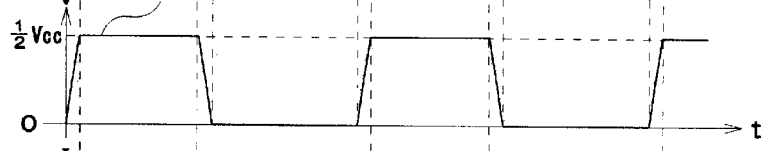
Figure 14C:
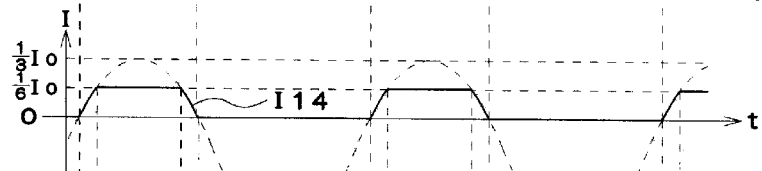
Figure 14D:
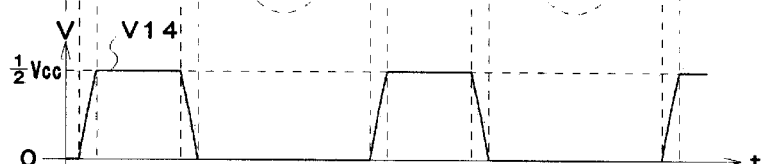
Figure 14E:
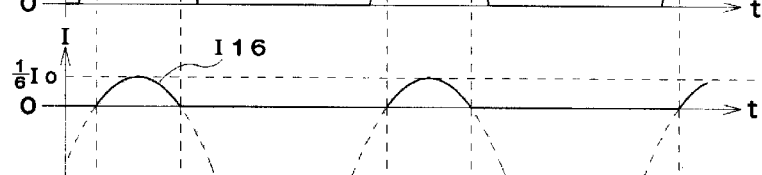

It can be seen from FIG. 14E that the current I16 is part of the current Ia shown in FIG. 4C that is greater than 5/6·I0.

The current I14 (partial control current, partial control signal) that flows through a resistor (of a resistance value 3R1) in parallel connection with the transistor 172 and current I12 (partial control current, partial control signal) that flows through a resistor (of a resistance value 3R1) in parallel connection with the transistor 156 may be determined in a similar method to that used when determining the current I2 of the previous embodiment. According to this method, the currents I14 and I12 are as shown in FIGS. 14C and 14A, respectively.

It can be seen from FIG. 14C that the current I14 is part of the current Ia shown in FIG. 4C that is greater than 4/6·I0 and smaller than 5/6·I0. Also it can be seen from FIG. 14A that the current I12 is part of the current Ia shown in FIG. 4C that is greater than 1/2·I0 and smaller than 4/6·I0.

In effect, it is arranged that part of the current Ia shown in FIG. 4C that is greater than 1/2·I0 is divided into three parts at two threshold values 5/6·I0 and 4/6·I0, and the three parts separated at the two threshold values are taken out as the currents I12, I14, and I16.

Figure 14F:
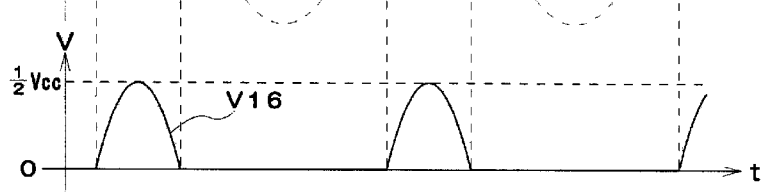
Figure 16A:
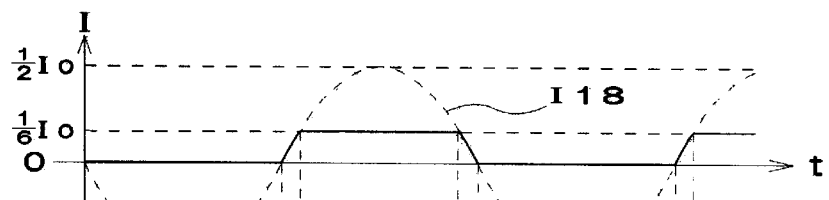
Figure 16C:
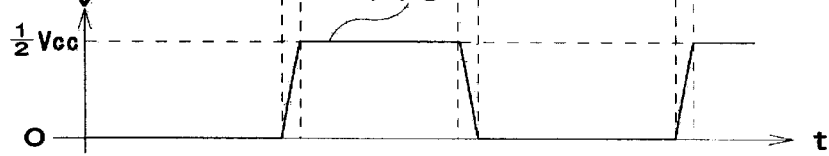
Figure 16D:
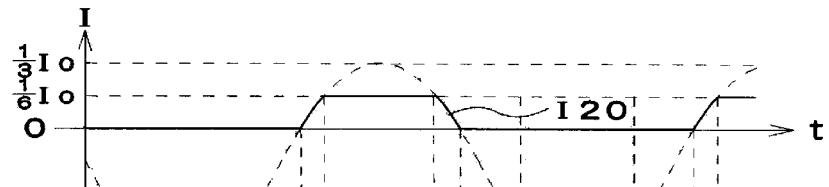
Figure 16E:
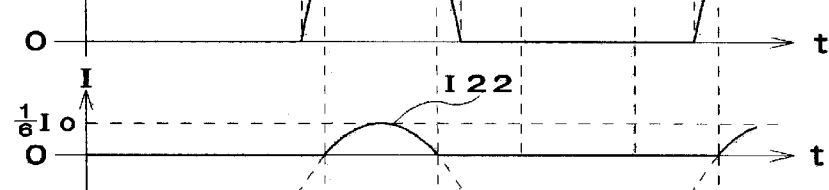

The currents I12, I14, and I16 taken out as described above are converted to voltages similarly to the previous embodiment and given to the drive section 120. That is to say, the currents I12, I14, and I16 produce voltages V12, V14, and V16 at the top end of the respective resistors (of a resistance value 3R1) that are given to the bases of transistors 192, 200, and 208 that respectively constitute the drive circuits 122, 124, and 126. The voltages V12, V14, and V16 are shown in FIGS. 14B, 14D, and 14F.

The currents I11, I13, and I15 that flow respectively through the transistors 152, 168, and 186 may be determined in a similar method to that used when determining the currents I1 and I3 of the previous embodiment. According to this method, the currents I11, I13, and I15 are as shown respectively in FIGS. 13A, 13C, and 13E.

Figure 13A:
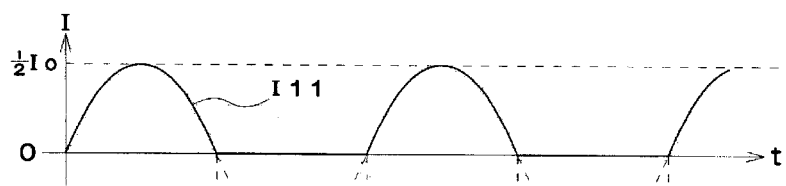
FIGS. 13A to 13F show signal waveforms in various parts of the control drive circuit of another embodiment of the invention.
Figure 13B:
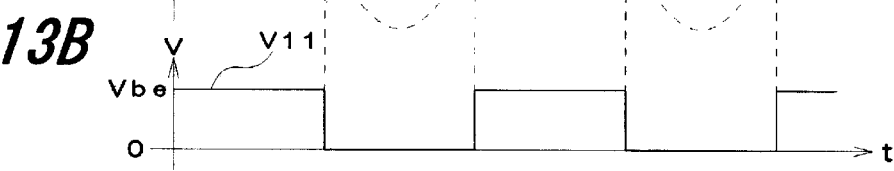
Figure 13C:
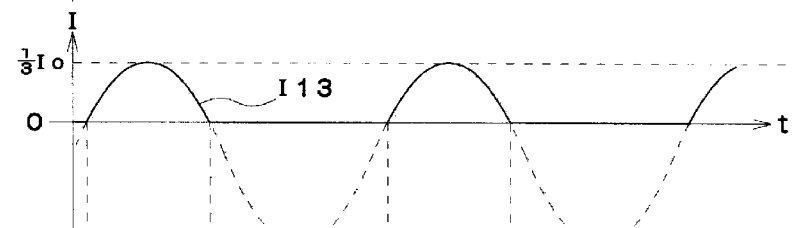
Figure 13D:
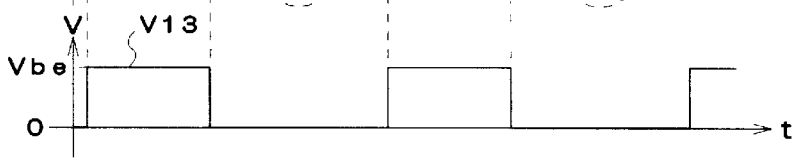
Figure 13E:
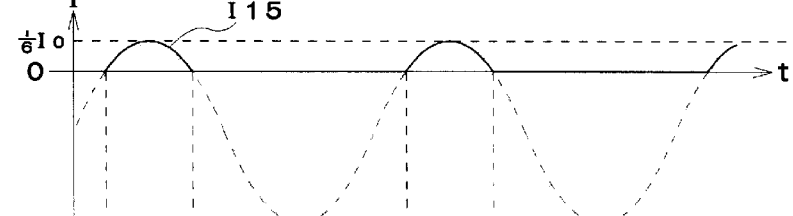
Figure 13F:
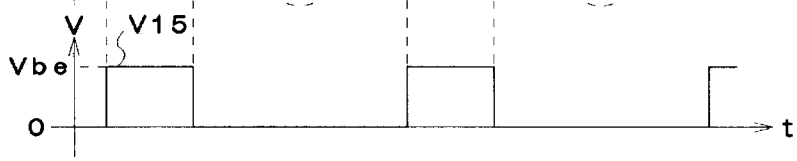

The currents I11, I13, and I15 taken out as described above are given to the drive section 120 similarly to the previous embodiment. Voltages V11, V13, and V15 produced with the currents I11, I13, and I15 at the bases of the transistors 198, 206, and 214 respectively constituting the drive circuits 122, 124, and 126 are shown in FIGS. 13B, 13D, and 13F.

Like in the previous embodiment, also in this embodiment, the second pre-drive section 118 is similarly constituted to the first pre-drive section 116 except that the current Ib flows as the control current.

Signal waveforms in the second pre-drive section 118 are shown in FIGS. 15A to 16F as counterparts of the waveforms in the first pre-drive section 116 shown in FIGS. 13A to 14F.

Next, the drive section 120 shown in FIG. 12 will be described. Unlike in the previous embodiment, the brushless servomotor M2 of this embodiment comprises three coils L3, L4, and L5. Therefore, the drive section 120 shown in FIG. 12 comprises three drive circuits 122, 124, and 126 for respectively driving the three coils L3, L4, and L5. However, the three drive circuits 122, 124, and 126 are constituted similarly to the drive circuits 22 and 24 shown in FIG. 3 as described before.

The coils L3, L4, and L5 are disposed in parallel in the brushless servomotor M2. Therefore, the outputs of the coils L3, L4, and L5 are superimposed to be the output of the brushless servomotor M2.

Figure 17A:
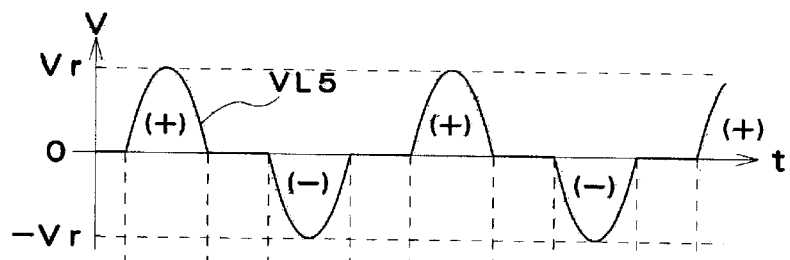
FIGS. 17A to 17D show signal waveforms in various parts of the control drive circuit of another embodiment of the invention.
Figure 17B:
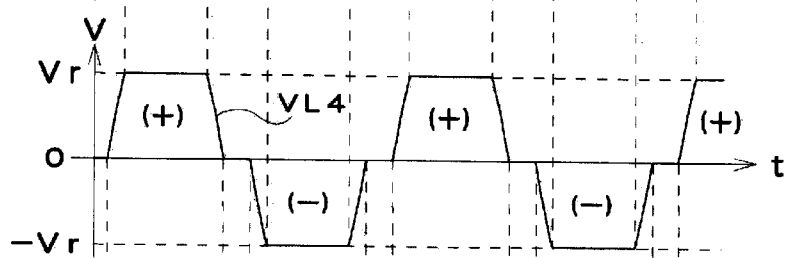
Figure 17C:
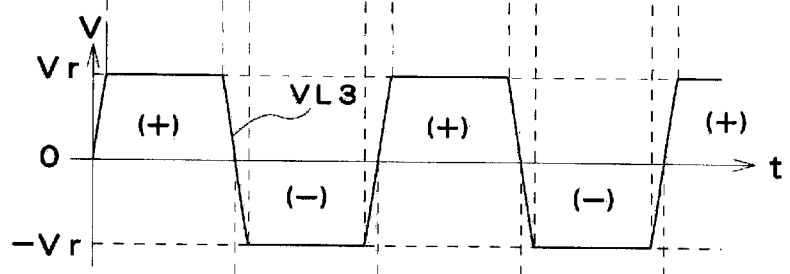
Figure 17D:
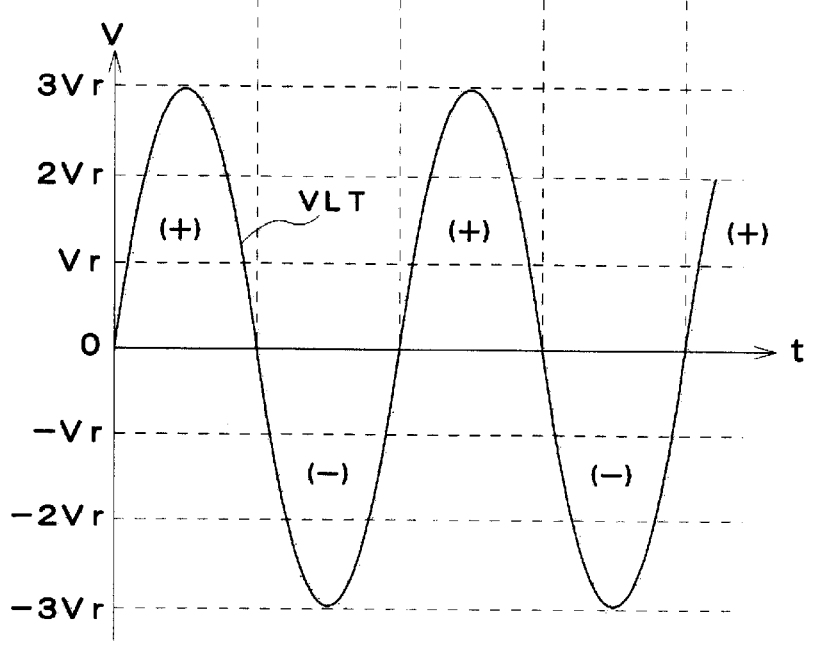

Voltages VL3, VL4, and VL5 that appear at the ends on one side of the coils L3, L4, and L5 are shown in FIGS. 17C, 17B and 17A relative to voltages that appear at the ends on the other side of the coils. A voltage VLT obtained by synthesizing (summing up) the voltages that appear in the coils L3, L4, and L5 is shown in FIG. 17D.

In this way, the outputs of the coils L3, L4, and L5 are superimposed to be the output of the brushless servomotor M2. That is to say, the voltage VLT obtained by synthesizing (summing up) the voltages VL3, VL4, and VL5 that appear in the coils L3, L4, and L5 has an alternating waveform as shown in FIG. 17D in which a positive voltage VLT(+) and a negative voltage VLT(−) appear by turns, with the former having a maximum value of three times the power source voltage Vr of the drive section 120, and with the latter having a minimum value of three times the negative value of the power source voltage Vr of the drive section 120. In other words, a drive output voltage having an amplitude of six times that of the power source voltage Vr of the drive section 120 is obtained.

In this embodiment too, the power source voltage Vr of the drive section 120 is set to the same voltage as maximum that appearing at the top end of the resistor (of a resistance value 3R1). Therefore, the power source voltage Vr of the drive section 120 in this embodiment is ½ of the power source voltage Vcc of the control circuit. As a result, an output of the brushless servomotor M2 is obtained that has a voltage amplitude of three times the power source voltage Vcc of the control circuit.

As described above, this embodiment like the previous one makes it possible to provide a drive output of a voltage higher than the power source voltage Vr of the drive section 120 and increase the dynamic range with a simple constitution.

When the amplitude of an inputted signal waveform is less than ⅔ of an assumed maximum amplitude, all the four transistors constituting the drive circuit 126 are turned off. As a result, power is saved when the input level is low. When the amplitude of an inputted signal waveform is less than ⅓ of an assumed maximum amplitude, all the eight transistors constituting the drive circuits 124 and 126 are turned off. As a result, power is further saved when the input level is low.

Like the previous embodiment, this embodiment is arranged to provide a partial control current that is smaller than a specified threshold value by taking away the partial control current that is greater than the threshold value from the control current when providing the partial control current by dividing the control current at the threshold value. Therefore, it is possible to provide a partial control current with less distortion.

As described above, this embodiment is constituted that the partial control current that is greater than the threshold value is taken away from the control current when the partial control current is obtained by dividing the control current at the specified threshold value. However, the method of obtaining the partial control current by dividing the control current at the specified threshold value is not limited to that described above.

FIGS. 18 to 21 are figures for explaining another embodiment of method of obtaining the partial control current by dividing the control current at specified threshold values.

Figure 18:
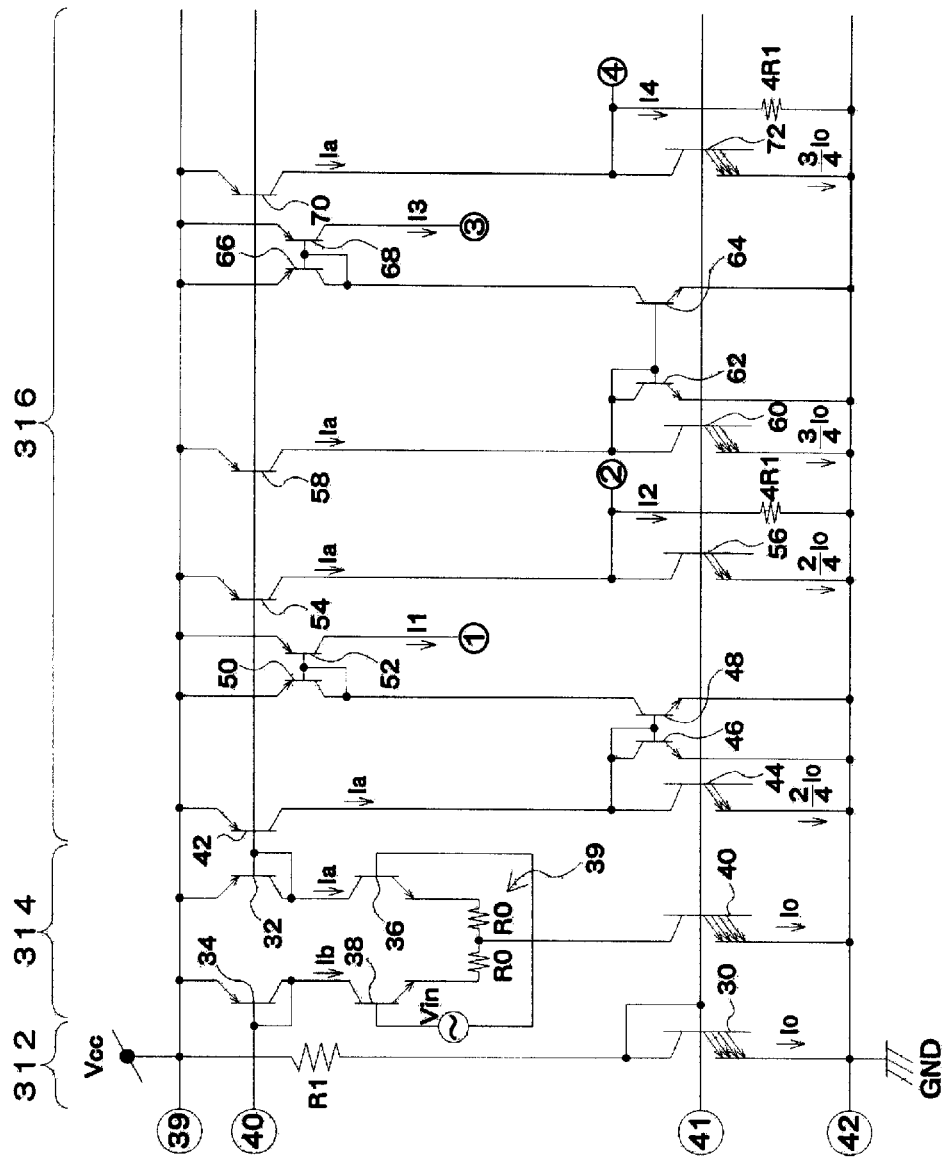
FIG. 18 shows part of a control drive circuit of still another embodiment of the invention.
Figure 19:
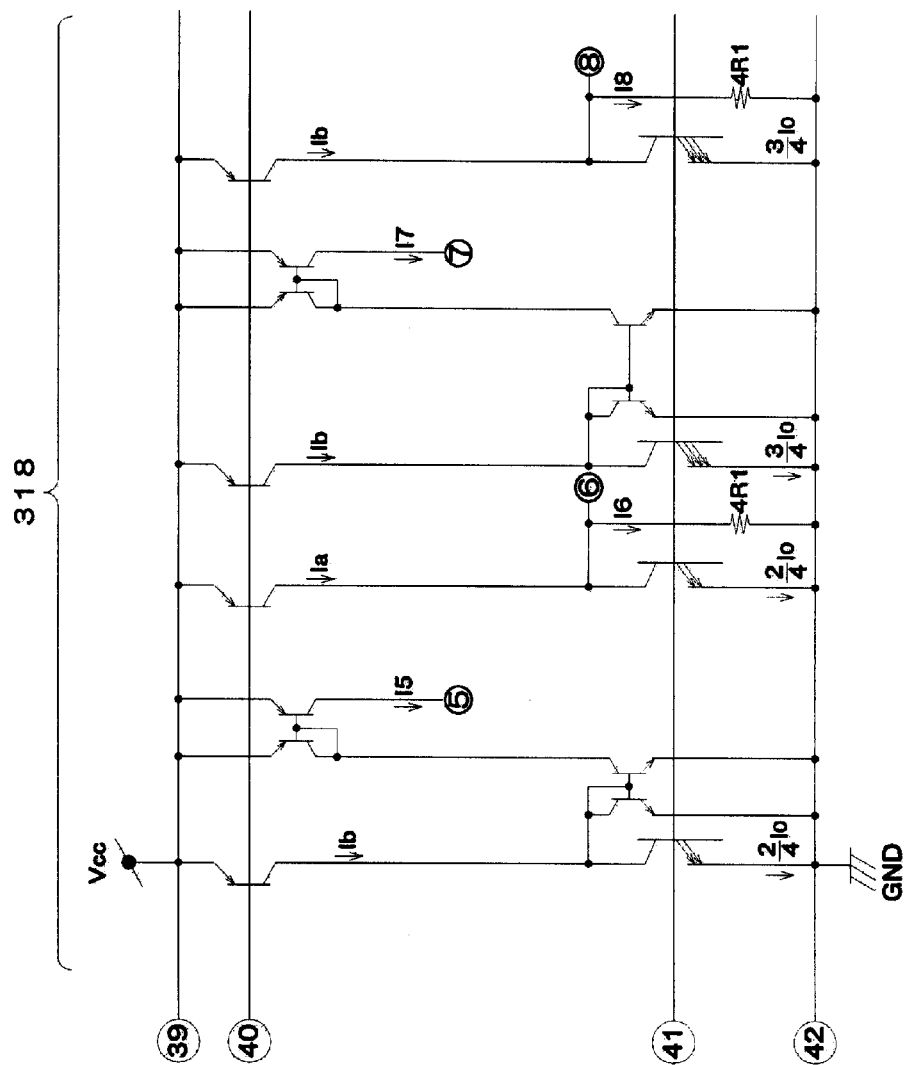
FIG. 19 shows part of a control drive circuit of still another embodiment of the invention

Part of the control drive circuit of this invention is shown in FIGS. 18 to 19. The control drive circuit comprises; a constant current generating section 312 (reference current generating section), a differential amplifier section 314 (control current generating section), and a first pre-drive section 316 (signal dividing section) shown in FIG. 18; and a second pre-drive section 318 (signal dividing section) shown in FIG. 19.

The drive section and the brushless servomotor (drive output synthesizing section) are constituted similarly to those in the first embodiment (Refer to FIG. 3 for the drive section 20 and the brushless servomotor M1), and so their descriptions are omitted here.

The constant current generating section 312 and the differential amplifier section 314 are respectively constituted similarly to the constant current generating section 12 and the differential amplifier section 14 shown in FIG. 1. Therefore, the signal waveforms Vina and Vinb inputted to the bases of the transistors 36 and 38, and the currents Ia and Ib that flow through the transistors 32 and 34 are, like in the first embodiment, as shown in FIGS. 4A to 4D.

While the first pre-drive section 316 shown in FIG. 18 is a counterpart of the first pre-drive section 16 shown in FIG. 1, the former is partially different from the latter.

Of the first pre-drive section 316 shown in FIG. 18, the circuit for obtaining the currents I1 and I3 are the same as those of the first pre-drive section 16 shown in FIG. 1. Therefore, like in the first embodiment, the current I1, the voltage V1, the current I3 and the voltage V3 are as shown in FIGS. 5A to 5D.

Of the first pre-drive section 316 shown in FIG. 18, the circuit for obtaining the voltages V2 and V4 is different from that of the first pre-drive section 16 shown in FIG. 1. That is to say, in the first embodiment, the resistance values of the resistors connected in parallel to the transistors 56 and 72 are two times (resistance value 2R1) the resistance value (R1) of the resistor connected in series to the transistor 30 of the constant current generating section 12. In this embodiment, however, the resistance values of the resistors connected in parallel to the transistors 56 and 72 are made (resistance value of about 4R1) slightly smaller than four times the resistance value (R1) of the resistor connected in series to the transistor 30.

Moreover, the first embodiment is constituted to take away the current I4 corresponding to the current flowing through the transistor 62 from the current Ia to obtain the current I2. However, this embodiment does not employ such a constitution.

Next will be described the currents I4 and I2 that flow through the resistors in this embodiment.

Figure 20A:
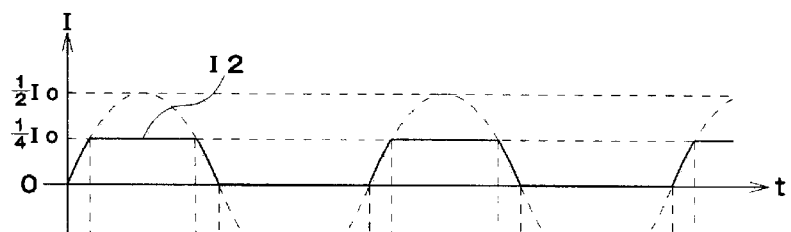
FIGS. 20A to 20D show signal waveforms in various parts of the control drive circuit of still another embodiment of the invention.
Figure 20B:
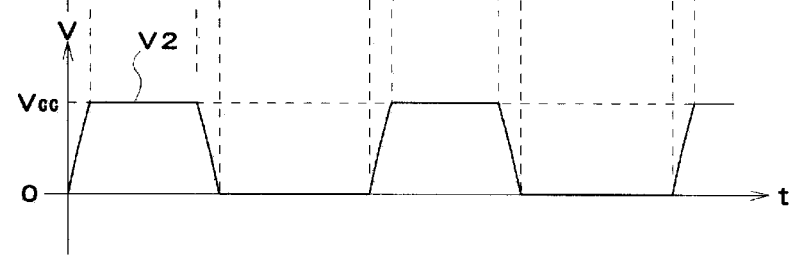
Figure 20C:
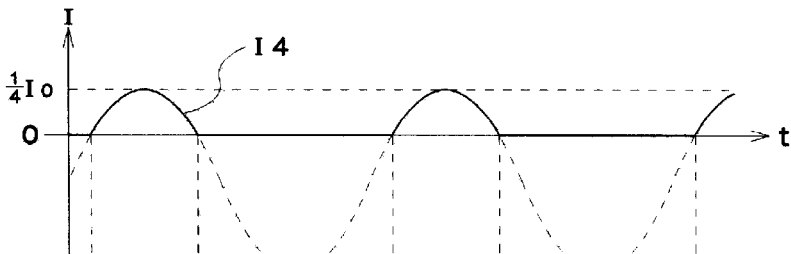
Figure 20D:
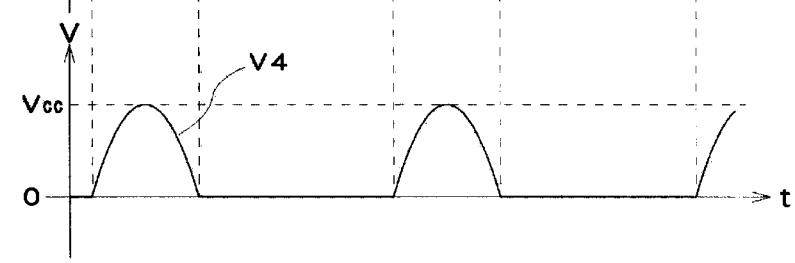
Figure 22:
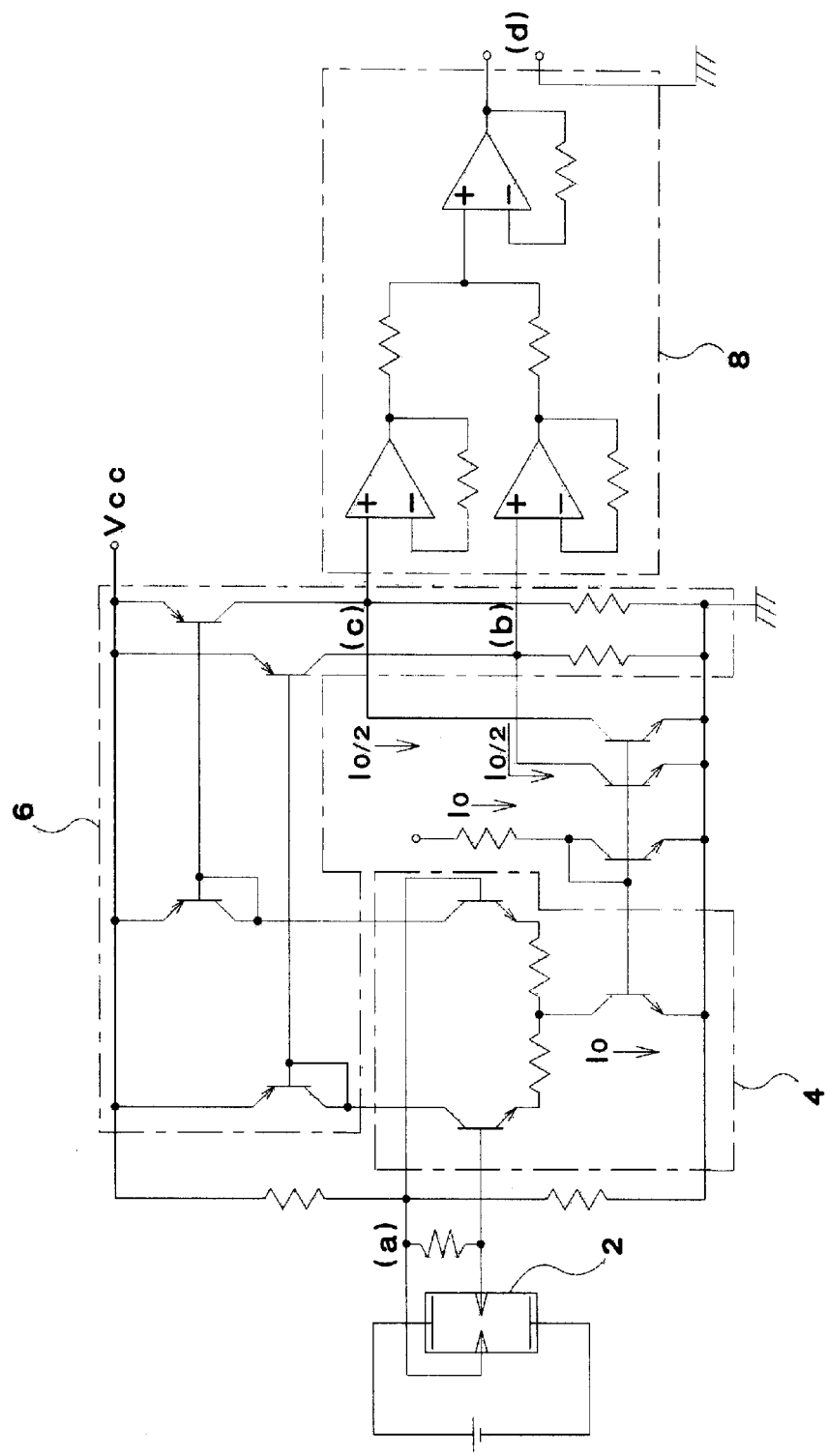
FIG. 22 shows an example constitution of a conventional control drive circuit.
Figure 23A:
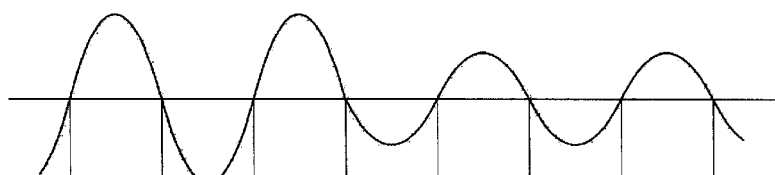
FIGS. 23A to 23D show signal waveforms in various parts of a conventional control drive circuit.
Figure 23B:
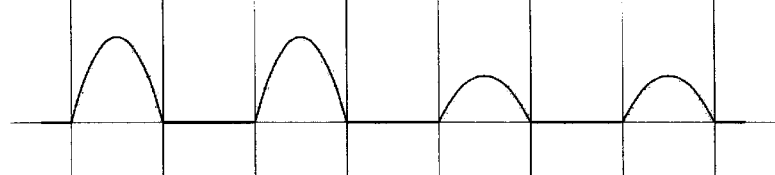
Figure 23C:
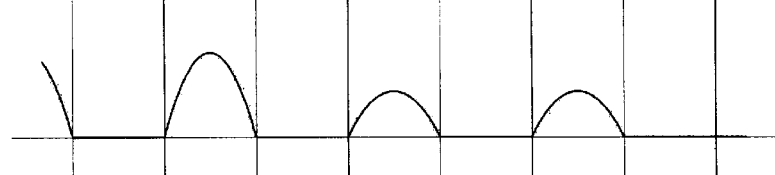
Figure 23D:
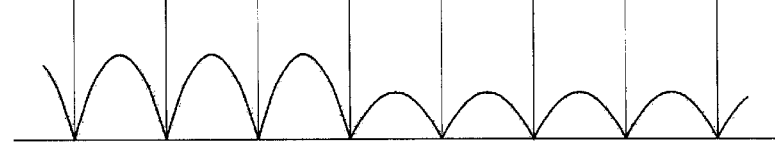

First, as shown in FIG. 20C, the current I4 is similar to that in the first embodiment (Refer to FIG. 6C). However, as described above, the value of the resistor connected in parallel to the transistor 72 is set to about two times that in the first embodiment. Therefore, the maximum value produced with the resistor is Vcc as shown in FIG. 20D.

Next will be described the current I2. As is seen from FIG. 18, when the current Ia exceeds 2/4·I0, the exceeding part only flows as the current I2. However as shown in FIG. 20A, the current I2 saturates at 1/4·I0. This is because the voltage produced with the current I2 through the resistor (of a resistance value of about 4R1) reaches the power source voltage Vcc (=R1·I0) at the current I2=1/4·I0 (Refer to FIG. 20B). That is to say, in this embodiment, the same current as the current I2 (See FIG. 6A) is obtained by causing the current I2 to saturate by adjusting the resistance value of the resistor.

In other words, this embodiment is arranged that the current I2 is caused to saturate by adjusting the resistance value, and to divide part of the current Ia greater than 1/2·I0 at the threshold value 3/4·I0.

Like in the first embodiment, the second pre-drive section 318 shown in FIG. 19 in this embodiment is also constituted in the same manner as the first pre-drive section 316 except that the current Ib flows as the control current.

The signal waveforms in the second pre-drive section 318 shown in FIGS. 21A to 21D are counterparts of the signal waveforms in the first pre-drive section 316 shown in FIGS. 20A to 20D, respectively.

Like with the first embodiment, the voltages VL1 and VL2 appearing at the ends on one side of the coils L1 and L2 that constitute the brushless servomotor M1, and the voltage VLT (See FIG. 3) obtained by synthesizing (summing up) the voltages appearing at ends on one side of the coils L1 and L2 are as shown in FIGS. 9A to 9C. That is to say, a drive output voltage having an amplitude of four times that of the power source voltage Vr of the drive section 20 is obtained.

Also in this embodiment, like in the first embodiment, the power source voltage Vr of the drive section 20 is set to the same as the maximum voltage that appears at the top end of the resistor (having a resistance value of about 4R1). As a result, the power source voltage Vr of the drive section 20 in this embodiment is the same as the power source voltage Vcc of the control circuit. Therefore, an output voltage having an amplitude of four times that of the power source voltage Vcc of the control circuit is obtained.

As described above, this embodiment is arranged to obtain the partial control currents (partial control signals) by saturating the control current. Therefore, it is possible to obtain control currents (control signals) with a simple circuit structure. Obtaining the partial control currents (partial control signals) by saturating the control currents also makes it possible to produce a power source voltage for drive that is equal to the power source voltage of the control circuit. Therefore, an output having a greater voltage amplitude is obtained.

Incidentally, each of the above embodiments is arranged that the power source voltage Vr of the drive section is given directly to the drive circuit. For example, the power source voltage Vr of the drive section 20 shown in FIG. 3 is given directly to the collectors of the transistors 92, 94, 100, and 102 constituting the drive circuits 22 and 24.

However, the following constitution is also possible: An npn type transistor (not shown) that is similar to the power source transistor Q5 described in FIG. 4 of a Japanese patent KOKOKU publication No. Hei 6-67265 is interposed between the power source voltage Vr of the drive section 20 shown in FIG. 3 of this application and the collectors of the transistors 92 and 94 constituting the drive circuit 22, and between the power source voltage Vr of the drive section 20 and the collectors of the transistors 100 and 102 constituting the drive circuit 24, respectively.

In that case, it is arranged that a voltage (corresponding to the output S6 described in FIG. 5(f) of the above Japanese patent KOKOKU publication No. Hei 6-67265), obtained by adding an inter-emitter-collector voltage of the transistors 92 and 94 when the transistors 92 and 94 are respectively turned on with the voltages V2 and V6 to a voltage obtained by synthesizing (summing up) the voltages V2 and V6 respectively shown in FIGS. 6B and 8B of this application, is applied to the base of the above-described transistor interposed between the power source voltage Vr of the drive section 20 and the collectors of the transistors 92 and 94 constituting the drive circuit 20.

Likewise, it is arranged that a voltage obtained by adding an inter-emitter-collector voltage of the transistors 100 and 102 when the transistors 100 and 102 are respectively turned on with the voltages V4 and V8 respectively shown in FIGS. 6D and 8D of this application to a voltage obtained by synthesizing (summing up) the voltages V4 and V8, is applied to the base of the above-described transistor interposed between the power source voltage Vr of the drive section 20 and the collectors of the transistors 100 and 102 constituting the drive circuit 24.

Interposing the transistors for the power source control as described above between the power source voltage Vr of the drive section 20 and the drive circuits 22, 24 respectively, further saves power.

Likewise, it may be constituted that the transistors for the power source control are interposed between the power source voltage Vr and the drive circuits 122, 124, and 126 shown in FIG. 12 of this application, respectively.

While the above embodiments are described as examples in which the circuits are used for driving the motor with coils, this invention is not limited to those examples but may be applied to circuits in general for driving circuits with coils , such as a circuit for driving a speaker with coils. This invention may be applied to circuits having a drive output synthesizing section besides coils.

Further, in the above embodiments, circuits are shown that constitute the reference current generating section, control current generating section, signal dividing section, partial drive output generating section, and drive output synthesizing section as examples. However, the sections are not limited to those mentioned circuits. Furthermore, this invention is not limited to the control drive circuit provided with the above-described sections.

The control drive circuit and control drive method of this invention are characterized in that partial control currents (partial control signals) are generated on the basis of an inputted waveform divided at a specified threshold value, partial drive outputs not exceeding a drive power source voltage are generated on the basis of the generated partial control currents (partial control signals), and a drive output of a voltage higher than the drive power source voltage is obtained by synthesizing the generated partial drive outputs.

Therefore, a drive output voltage higher than a drive power source voltage can be obtained with a simple constitution. Therefore, a dynamic range can be increased with a simple structure. Moreover, when the amplitude of an inputted signal waveform is small, namely when the input level is low, some of the partial control currents do not occur. This results in energy saving when the input level is low.

While this invention is described above by way of preferred embodiments, every term is used not for limitation but for explanation and may be modified without departing from the scope and spirit of this invention as specified in the appended claims.

What is claimed is:

1. A control drive circuit for obtaining a drive output on the basis of an inputted signal waveform, characterized by comprising;

a reference current generating section for generating a reference current, a control current generating section for generating on the basis of the inputted signal waveform a control current with its median being half the reference current, a signal dividing section for obtaining a partial control current by dividing the control current at a specified threshold value, a partial drive output generating section for generating on the basis of the partial control current partial drive outputs not exceeding the drive power source voltage, and a drive output synthesizing section for obtaining a drive output of a higher voltage than the drive power source voltage by synthesizing the generated partial drive outputs.

2. A control drive circuit of claim 1, characterized in that the reference current generating section is a constant current generating section that generates a current of a constant value as the reference current.

3. A control drive circuit of claim 2, characterized in that the constant current generating section is constituted with a resistor and a transistor interposed in series connection between a ground potential and a power source of the control circuit to supply a constant current to the transistor.

4. A control drive circuit of claim 2, characterized in that the control current generating section generates, on the basis of a pair of inputted signal waveforms having a mutual phase difference of π, a pair of control currents each having a median that is half the reference current and a mutual phase difference of π.

5. A control drive circuit of claim 4, characterized in that the control current generating section is provided with a differential amplifying circuit driven with a current of the same value as that of the reference current generated with the constant current generating section and generates, on the basis of the pair of signal waveforms having a mutual phase difference of π and inputted to the differential amplifying circuit, a pair of control currents having a mutual phase difference of π and a median that is half the reference current.

6. A control drive circuit of claim 4, characterized in that the signal dividing section divides part of the pair of control currents, exceeding the median, generated with the control current generating section and having a mutual phase difference of π, at one or more than one specified threshold value or values to generate two sets of the partial control currents having a mutual phase difference of π.

7. A control drive circuit of claim 6, characterized in that the signal dividing section takes away a current, smaller than the one threshold value or the greatest one of the more than one threshold values, from a current that is the same as the control current, and the remaining current is obtained as the partial control current that exceeds the greatest threshold value.

8. A control drive circuit of claim 6, characterized in that the signal dividing section takes away a current that is smaller than the median and takes away a current that is greater than the one threshold value or the smallest one of the more than one threshold values, from a current that is the same as the control current, and the remaining current is obtained as the partial control current with its lowest and highest limits being at the median and the smallest threshold value, respectively.

9. A control drive circuit of claim 6, characterized in that the signal dividing section takes away a current that is smaller than a specified one of more than one threshold values and takes away a current that is greater than another threshold value adjacent to and greater than the specified threshold value from a current that is the same as the control current, and the remaining current is obtained as the partial control current with its lowest and highest limits being the specified threshold value and the threshold value that is greater than the specified threshold value, respectively.

10. A control drive circuit of claim 6, characterized in that the signal dividing section is constituted to take out a current, that flows through a resistor when a current that is the same as the control current is given to a circuit constituted with a transistor and the resistor connected in parallel, as the partial control current; takes away a current that is smaller than the median from the current that is the same as the control current by the use of the transistor; and generates the partial control current with its lowest and highest limits being the median and the smallest threshold value respectively by setting the value of the resistor so that the sum of the currents that flow through the transistor and the resistor saturates when the sum becomes equal to the one threshold value or the smallest one of the more than one threshold values.

11. A control drive circuit of claim 6, characterized in that the signal dividing section is constituted to take out a current, that flows through a resistor when a current that is the same as the control current is given to a circuit constituted with a transistor and the resistor connected in parallel, as the partial control current; takes away a current that is smaller than a specified one of the more than one threshold values from the current that is the same as the control current by the use of the transistor; and generates the partial control current with its lowest and highest limits being the specified threshold value and the threshold value that is adjacent to and greater than the specified threshold value respectively by setting the value of the resistor so that the sum of the currents that flow through the transistor and the resistor saturates when the sum becomes equal to the threshold value that is adjacent to the specified threshold value and greater than the specified threshold value.

12. A control drive circuit of claim 6, characterized in that the partial drive output generating section reverses, on the bases of the two sets of partial control currents having a mutual phase difference of $\pi$ and generated with the signal dividing section, the polarity of one of a corresponding pair of partial control currents having a mutual phase difference of $\pi$ of the two sets of partial control currents, and synthesizes them to generate partial drive outputs in a number that is half the number of the partial control currents.

13. A control drive circuit of claim 12, characterized in that the partial drive output generating section comprises the same number of bridge circuits as the number of the partial drive outputs, each side of a bridge circuit is provided with a transistor, a corresponding pair of partial control currents having a mutual phase difference of $\pi$ of the two sets of partial control currents are given to the control input terminals of an opposing pair of transistors, a voltage that is approximately the same as the drive power source voltage is given between the opposing pair of corners of the bridge circuit, and the partial drive output is taken out from the other pair of opposing corners.

14. A control drive circuit of claim 12, characterized in that the drive output synthesizing section produces a drive output of a higher voltage than the drive power source voltage by synthesizing the plural number of partial drive outputs generated with the partial drive output generating section.

15. A control drive circuit of claim 14, characterized in that the drive output synthesizing section is constituted with the same number of coils disposed in parallel as the number of the partial drive outputs and that the plural number of partial drive outputs are given to the respective coils.

16. A control drive circuit of claim 15, characterized in that the coils are those which constitute a motor.

17. A control drive circuit of claim 16, characterized in that the motor is a brushless servomotor and that the inputted signal waveform is one obtained with a sensor for detecting the motor rotation.

18. A control drive circuit of claim 15, characterized in that the coils are those which constitute a speaker.

19. A control drive circuit of claim 18, characterized in that the control drive circuit is one for driving the speaker and that the inputted signal waveform is a drive signal waveform for driving the speaker.

20. A control drive method for obtaining a drive output on the basis of an inputted signal waveform, characterized in that partial control signals are generated on the basis of an inputted waveform divided at a specified threshold value, partial drive outputs not exceeding a drive power source voltage are generated on the basis of the generated partial control signals, and a drive output of a voltage higher than the drive power source voltage is obtained by synthesizing the generated partial drive outputs.

\* \* \* \* \*